(12) United States Patent
Van Gerwen

(10) Patent No.: US 9,637,365 B2
(45) Date of Patent: May 2, 2017

(54) MOVABLE UNIT FOR TRANSPORT OF A MOULD DRUM AND METHODS THEREOF

(71) Applicant: GEA FOOD SOLUTIONS BAKEL B.V., Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 14/748,725

(22) Filed: Jun. 24, 2015

(65) Prior Publication Data
US 2015/0344275 A1    Dec. 3, 2015

Related U.S. Application Data

(62) Division of application No. 13/994,973, filed as application No. PCT/EP2011/006458 on Dec. 21, 2011, now Pat. No. 9,162,375.

(30) Foreign Application Priority Data

Dec. 23, 2010    (EP) .................................... 10016025

(51) Int. Cl.
*B29C 33/72*    (2006.01)
*B66F 9/065*    (2006.01)
(Continued)

(52) U.S. Cl.
CPC ............ *B66F 9/065* (2013.01); *A22C 7/0038* (2013.01); *A22C 7/0069* (2013.01);
(Continued)

(58) Field of Classification Search
CPC ...... A22C 7/003; A22C 7/0038; A22C 7/0069; A22C 7/0076; A23P 1/105; B29C 33/72; B08B 9/032; B08B 9/0328
(Continued)

(56) References Cited

U.S. PATENT DOCUMENTS 2,657,423 A    11/1953    Elsaesser
3,177,524 A    4/1965    Gause
(Continued)

FOREIGN PATENT DOCUMENTS

AL    2008/091634 A2    7/2008
DE    102006020361 A1    8/2007
(Continued)

OTHER PUBLICATIONS

STS Drum Stacker, http://www.sts-trolleys.co.uk/drum-handling/image/Specials/STP01-DF-03.gif, published Feb. 10, 2009, accessed Mar. 8, 2016.*
(Continued)

*Primary Examiner* — Alison L Hindenlang
*Assistant Examiner* — Lawrence D Hohenbrink, Jr.
(74) *Attorney, Agent, or Firm* — The Dobrusin Law Firm, P.C.

(57) ABSTRACT

The present invention relates to a mold drum for molding products from a mass of food starting material. The mold drum comprises one or more cavities with a mold cavity wall having at least partially a porous structure, whereas each cavity is connected to a passage. The present invention further relates to a cleaning apparatus for the inventive mold drum with supporting means for supporting the axis of the drum. Additionally, the present invention relates to a process for cleaning the inventive drum.

23 Claims, 34 Drawing Sheets

(51) Int. Cl.
| | |
|---|---|
| B08B 9/032 | (2006.01) |
| A22C 7/00 | (2006.01) |
| B08B 9/023 | (2006.01) |
| B30B 11/18 | (2006.01) |
| B08B 3/02 | (2006.01) |
| B08B 9/00 | (2006.01) |
| B30B 11/12 | (2006.01) |
| F16C 13/00 | (2006.01) |
| B08B 3/04 | (2006.01) |
| F16C 41/00 | (2006.01) |
| A23P 30/10 | (2016.01) |

(52) U.S. Cl.
CPC ............ A22C 7/0076 (2013.01); A23P 30/10 (2016.08); B08B 3/02 (2013.01); B08B 3/04 (2013.01); B08B 9/00 (2013.01); B08B 9/023 (2013.01); B08B 9/032 (2013.01); B29C 33/72 (2013.01); B30B 11/12 (2013.01); B30B 11/18 (2013.01); F16C 13/00 (2013.01); F16C 41/008 (2013.01); A22C 7/003 (2013.01); B08B 9/0328 (2013.01)

(58) Field of Classification Search
USPC ........ 425/226, 227, 230, 435, 317; 426/389, 426/513; 134/34, 22.12
See application file for complete search history.

(56) References Cited

U.S. PATENT DOCUMENTS

| | | |
|---|---|---|
| 3,205,837 A | 9/1965 | Fay |
| 3,213,486 A | 10/1965 | Blake |
| 3,347,176 A | 10/1967 | Hall |
| 3,427,649 A | 2/1969 | Fay |
| 3,724,026 A | 4/1973 | Gernandt |
| 3,750,232 A | 8/1973 | Holly |
| 3,823,633 A | 7/1974 | Ross |
| 3,991,440 A | 11/1976 | Hendrickson, Jr. |
| 3,998,574 A | 12/1976 | Blake |
| 4,182,003 A | 1/1980 | Lamartino et al. |
| 4,212,609 A | 7/1980 | Fay |
| 4,418,446 A | 12/1983 | Sandberg |
| 4,582,226 A | 4/1986 | Doak |
| 4,625,612 A | 12/1986 | Oliver |
| 4,630,425 A | 12/1986 | Reed |
| 4,630,426 A | 12/1986 | Gentry |
| 4,768,325 A | 9/1988 | Lindee et al. |
| 4,987,643 A | 1/1991 | Powers |
| 5,102,238 A | 4/1992 | Contzen |
| 5,536,329 A | 7/1996 | St. Martin |
| 6,131,372 A | 10/2000 | Pruett |
| 6,368,092 B1 | 4/2002 | Lindee |
| 6,371,278 B1 | 4/2002 | Hart et al. |
| 6,764,293 B2 | 7/2004 | Kashulines et al. |
| 7,146,992 B2 | 12/2006 | Elick et al. |
| 7,467,636 B2 | 12/2008 | Welch |
| 7,819,650 B2 | 10/2010 | Meskendahl et al. |
| 2005/0013895 A1 | 1/2005 | Azzar |
| 2005/0042321 A1 | 2/2005 | LaBruno |
| 2005/0214399 A1 | 9/2005 | LaBruno et al. |
| 2005/0220932 A1 | 10/2005 | Van Der Eerden |
| 2007/0224305 A1* | 9/2007 | Meskendahl et al. ........................ A22C 7/0038 425/171 |
| 2008/0008799 A1 | 1/2008 | Zugar |
| 2008/0202226 A1 | 8/2008 | Heim et al. |
| 2009/0134544 A1 | 5/2009 | Van der Eerden et al. |
| 2011/0014344 A1 | 1/2011 | Meskendahl et al. |
| 2011/0151082 A1 | 6/2011 | VanGerwen |
| 2012/0003374 A1 | 1/2012 | Van der Eerden et al. |
| 2012/0058213 A1 | 3/2012 | Lindee et al. |
| 2013/0045294 A1 | 2/2013 | Van Gerwen et al. |
| 2013/0164403 A1 | 6/2013 | Boogers et al. |
| 2013/0224357 A1 | 8/2013 | Van Gerwen |
| 2013/0291483 A1 | 11/2013 | Van Gerwen |

FOREIGN PATENT DOCUMENTS

| | | |
|---|---|---|
| EP | 0 638 371 A1 | 2/1995 |
| EP | 0818148 A1 | 1/1998 |
| EP | 1520480 A1 | 4/2005 |
| EP | 1920847 A1 | 5/2008 |
| EP | 2064956 A1 | 6/2009 |
| FR | 2387609 A1 | 11/1978 |
| GB | 1015820 A | 1/1966 |
| GB | 2312641 A | 11/1997 |
| JP | S57-43637 A | 3/1982 |
| JP | S58-056632 | 4/1983 |
| JP | H08-116861 A | 5/1996 |
| JP | 2001-200767 A | 7/2001 |
| JP | 2001299317 A | 10/2001 |
| JP | 2002-224508 A | 8/2002 |
| JP | 2004-521652 A | 7/2004 |
| JP | 2005-530514 A | 10/2005 |
| JP | 2007-536927 A | 12/2007 |
| WO | 88/07003 A1 | 9/1988 |
| WO | 96/09210 A1 | 3/1996 |
| WO | 2004/002229 A2 | 1/2004 |
| WO | 2005/009696 A1 | 2/2005 |
| WO | 2005/107481 | 11/2005 |
| WO | 2006/020139 A1 | 2/2006 |
| WO | 2010/110655 A1 | 9/2010 |
| WO | 2012/012581 A1 | 1/2012 |
| WO | 2012/055454 A2 | 5/2012 |
| WO | 2012/059188 A1 | 5/2012 |
| WO | 2012/107236 A2 | 8/2012 |
| WO | WO2012/107236 | 8/2012 |

OTHER PUBLICATIONS

Crown Equipment Forklift brochure, 2008.*
Third Party Observation for European Patent Office Application Nos. EP2468104 and EP2654439, dated Jul. 3, 2015.
*Townsend Further Processing News,* brochure, published Jun. 2010.
International Preliminary Report on Patentability Application No. PCT/EP2011/006458, mailed Apr. 18, 2013.
International Search Report and Written Opinion of the International Search Authority, Application No. PCT/EP2011/006458, mailed Jun. 13, 2012.
European Search Report, Application No. EP 10016025.8, dated Nov. 25, 2011.
Japanese Office Action, Application No. 2013-545105 dated Jul. 28, 2015.

* cited by examiner

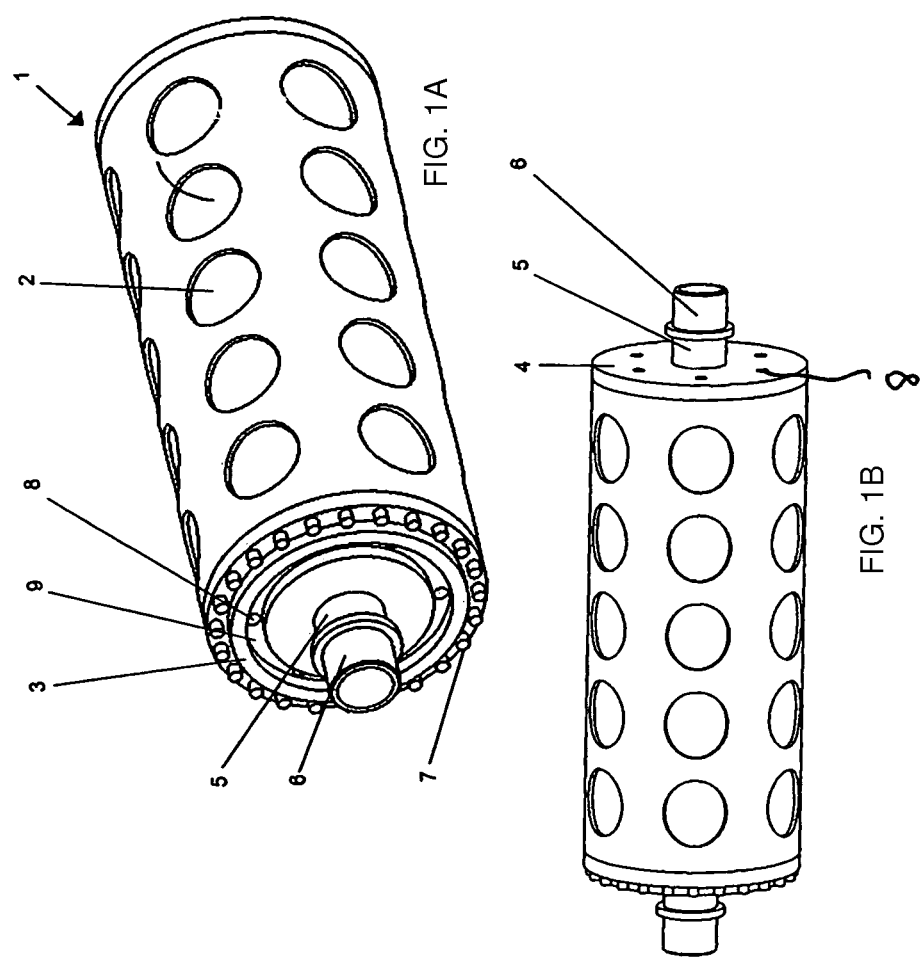

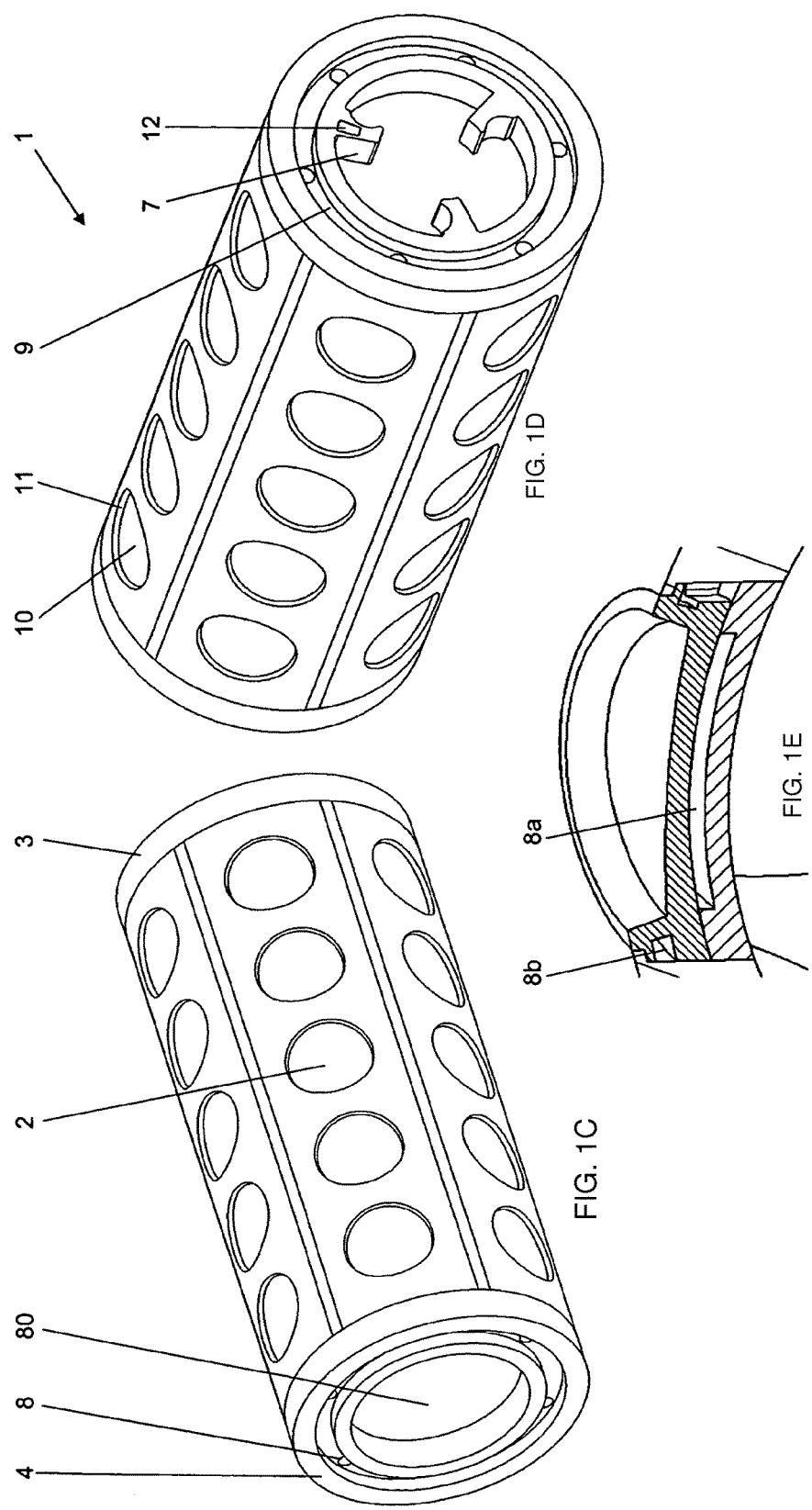

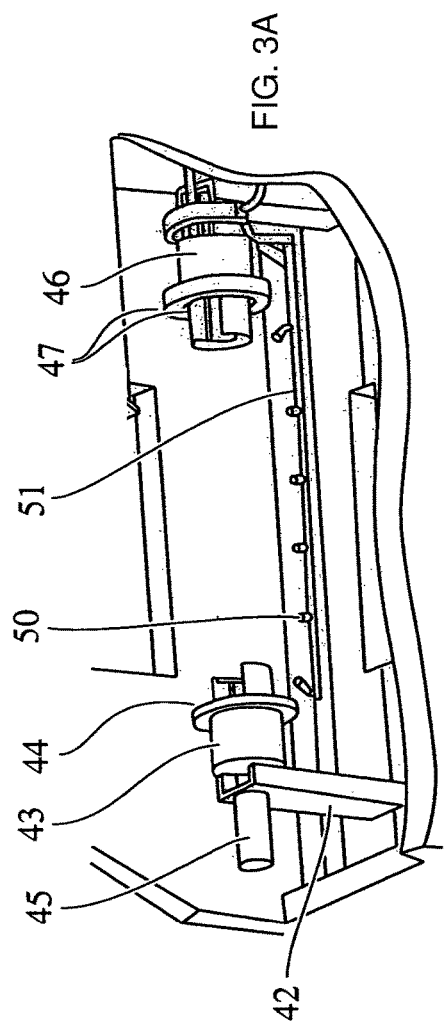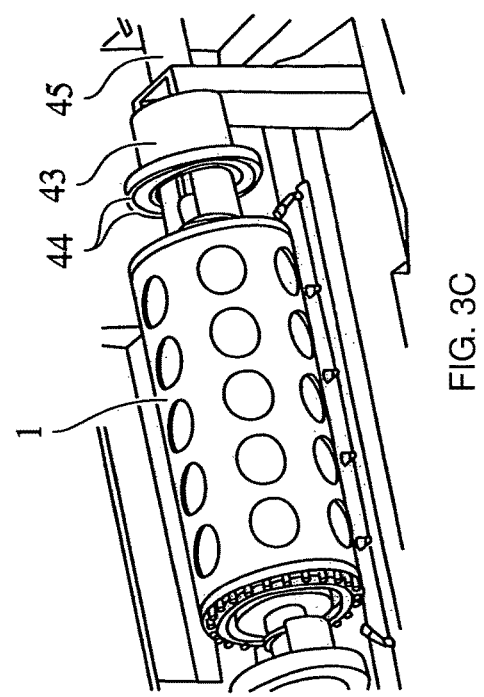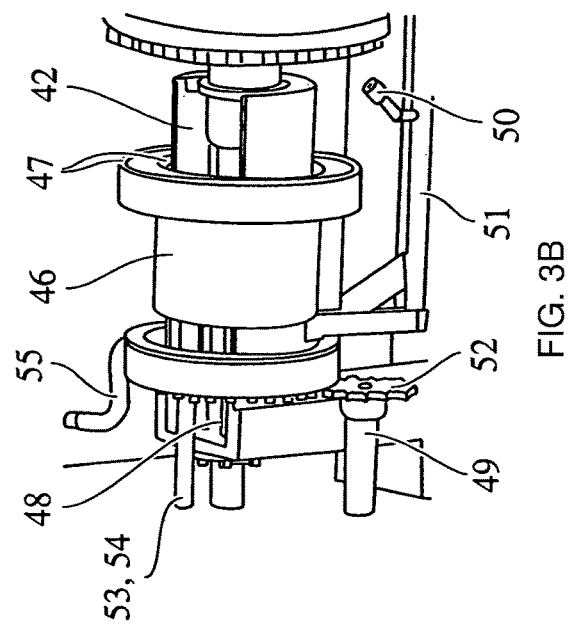

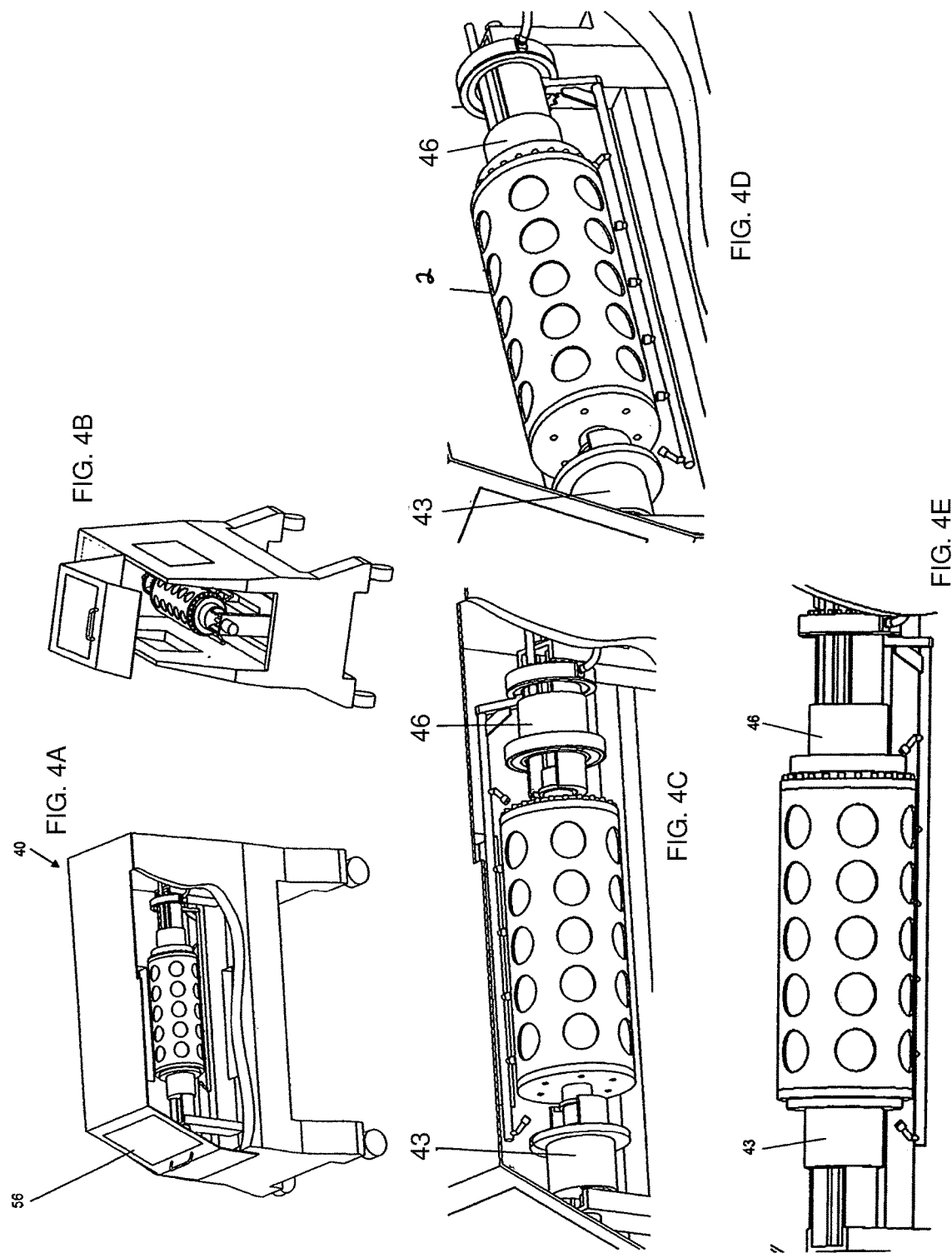

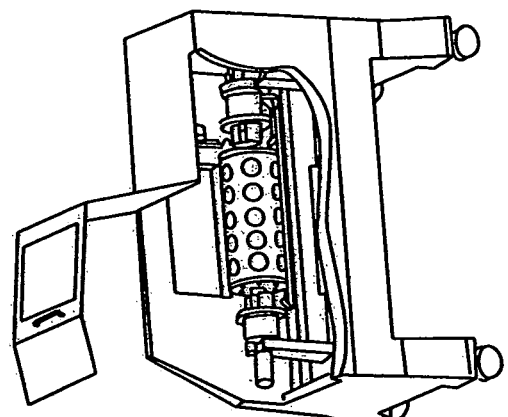
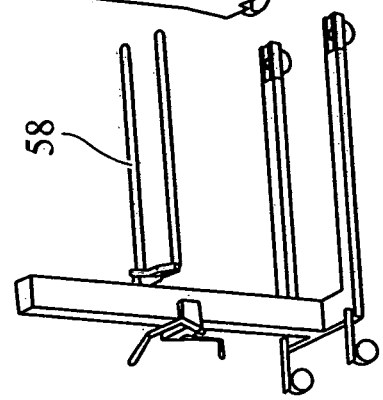
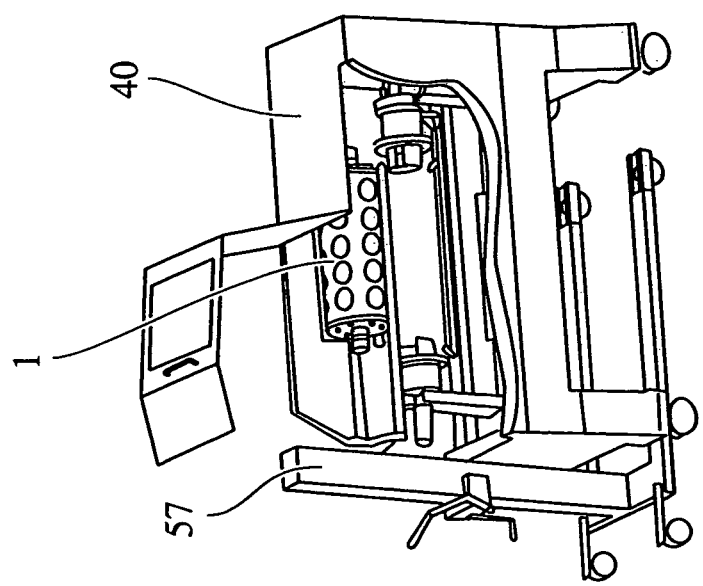
FIG. 5B
FIG. 5A

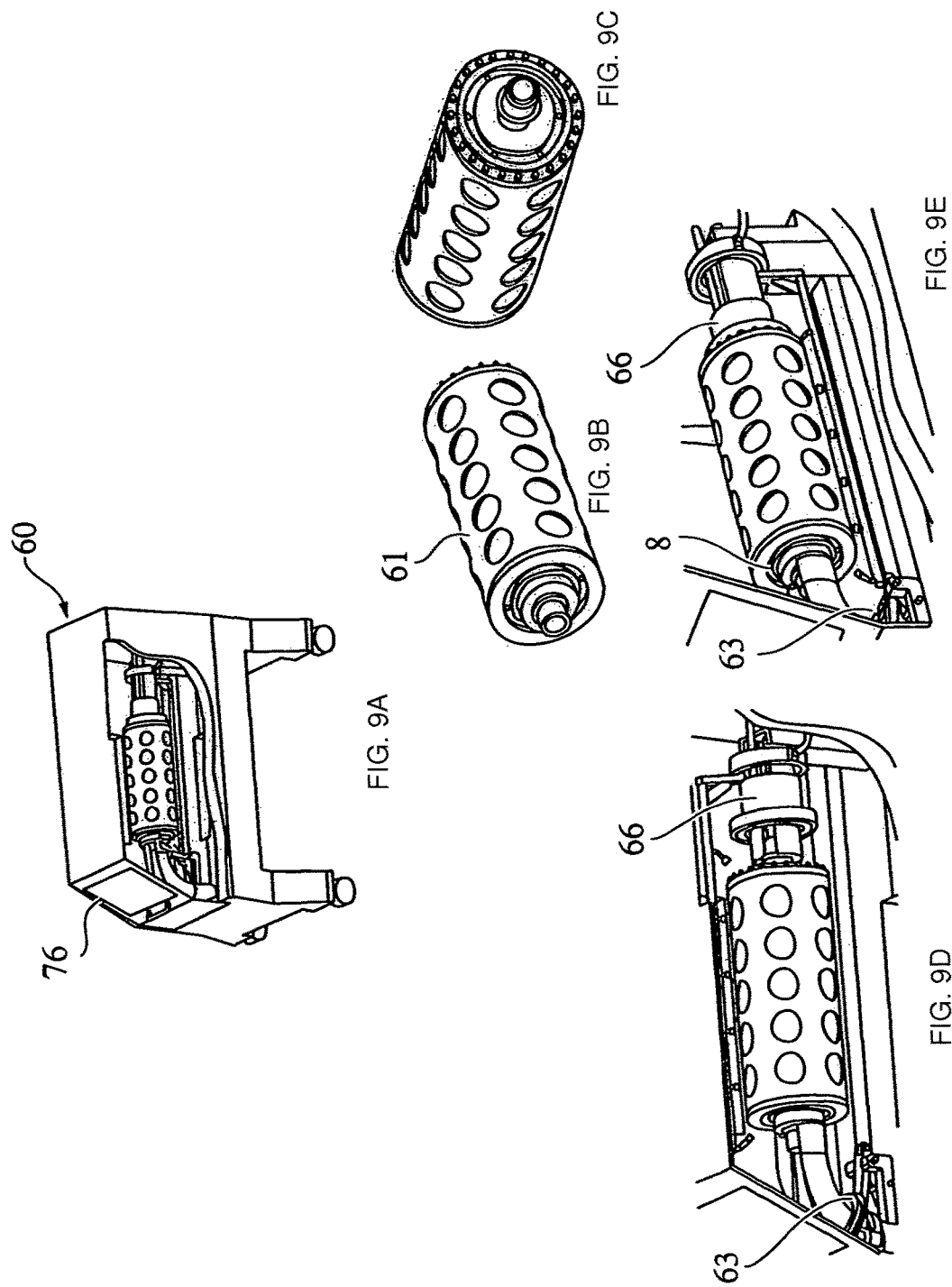

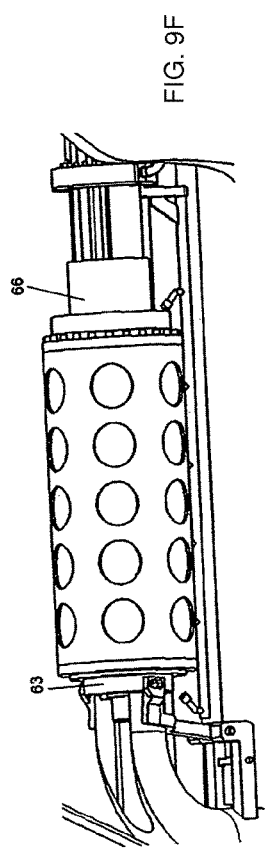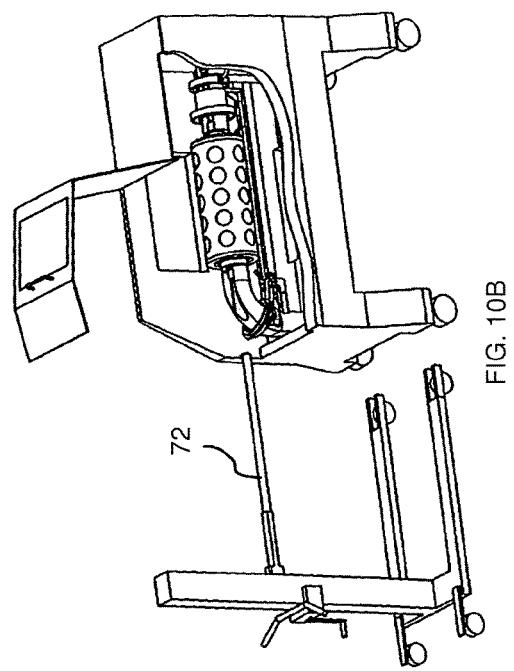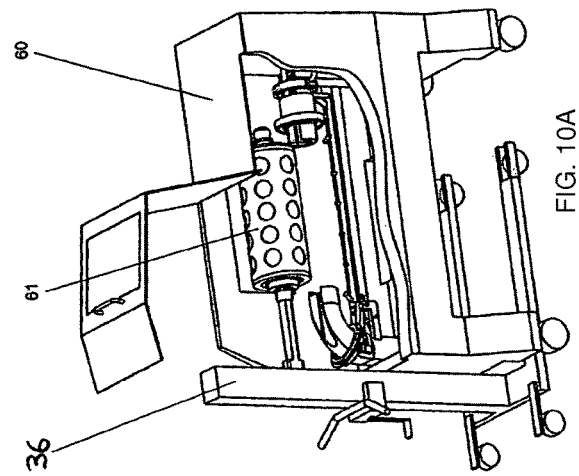

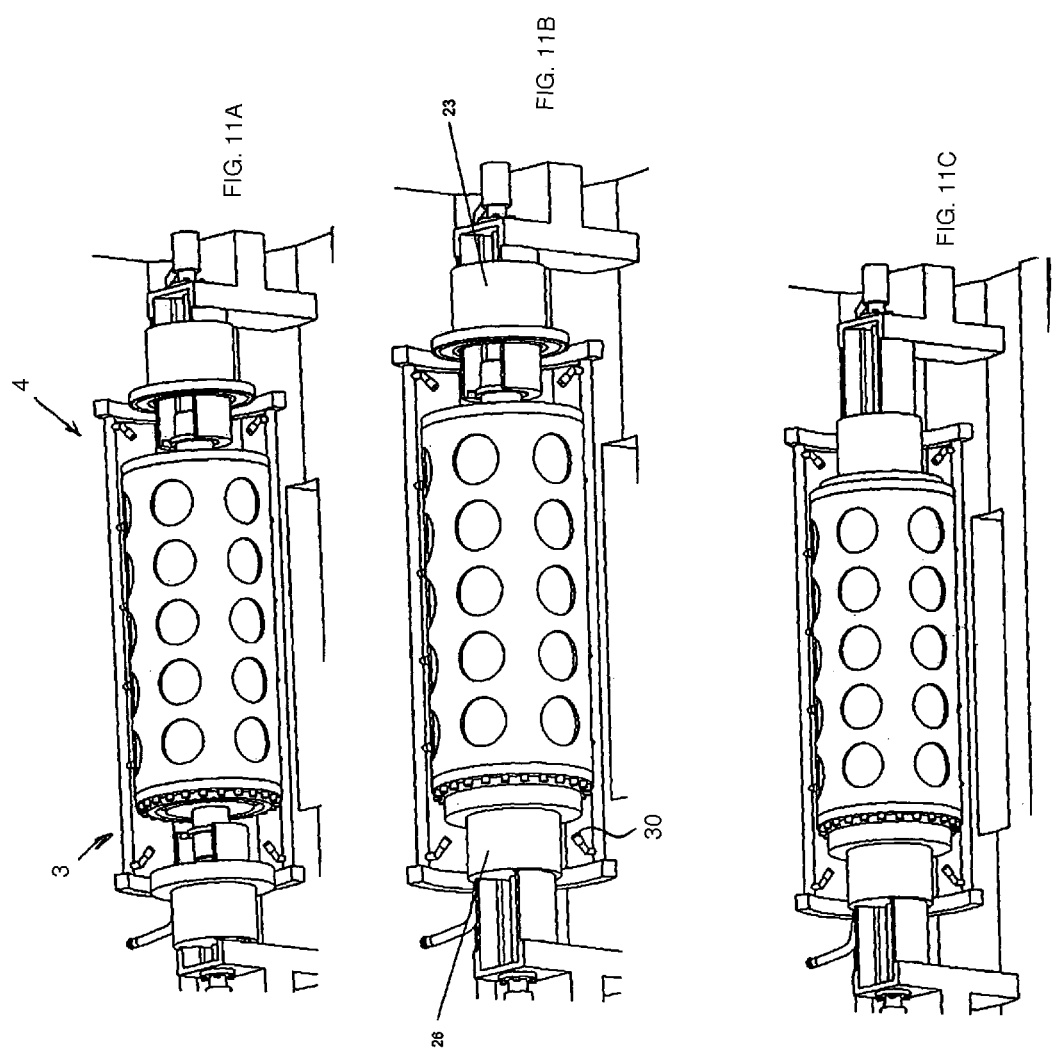

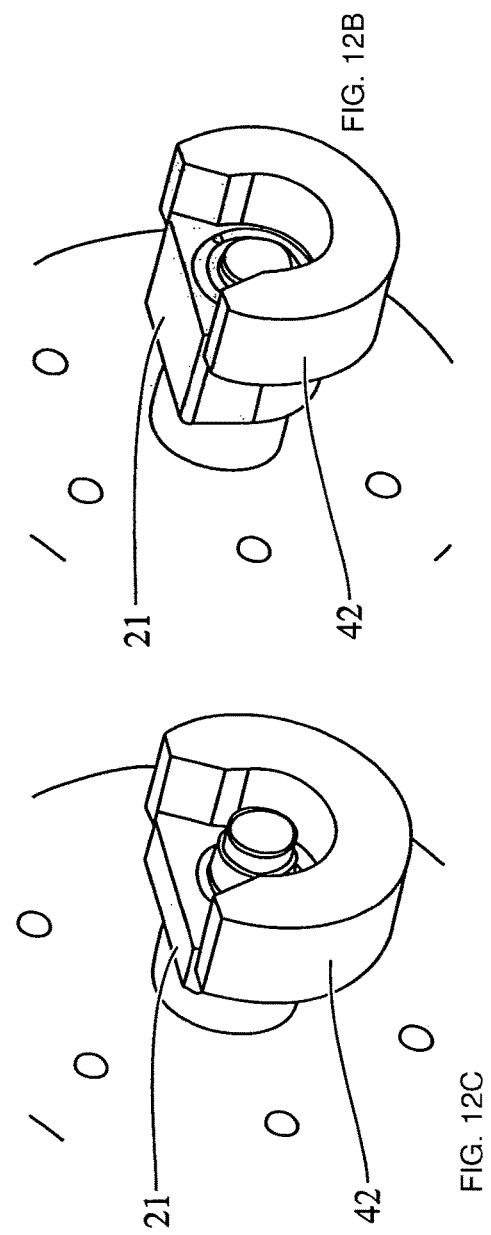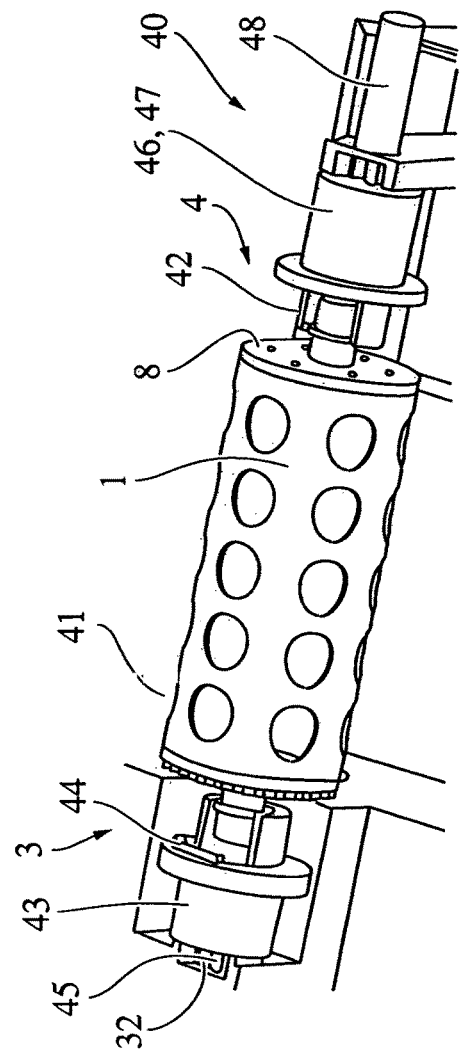

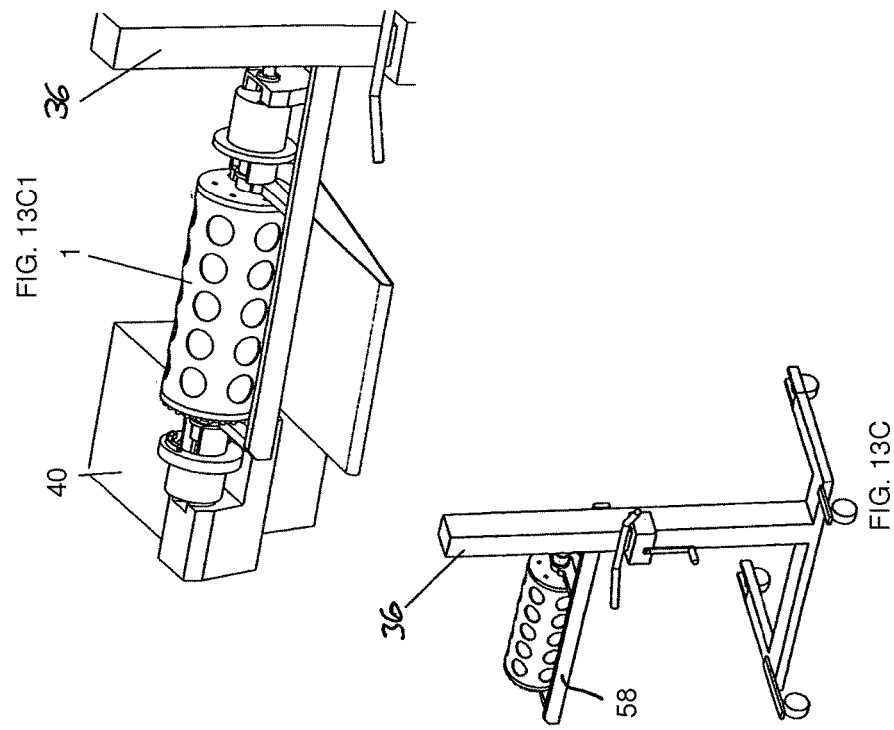
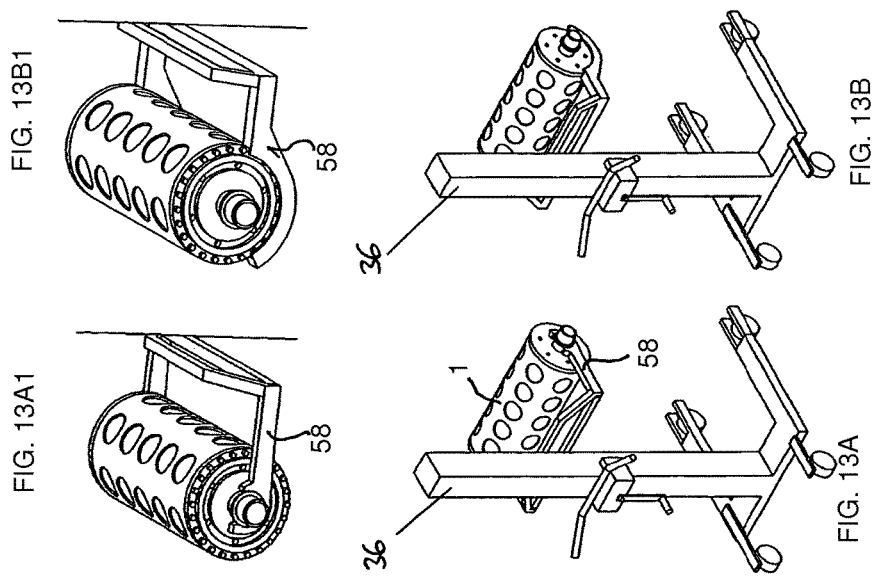

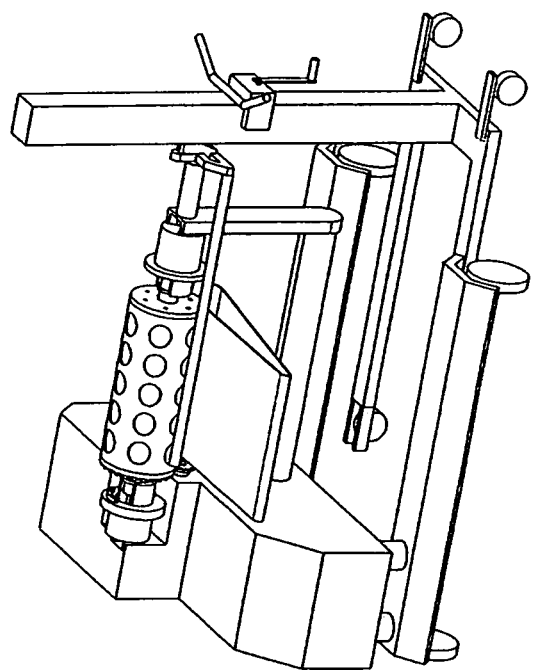
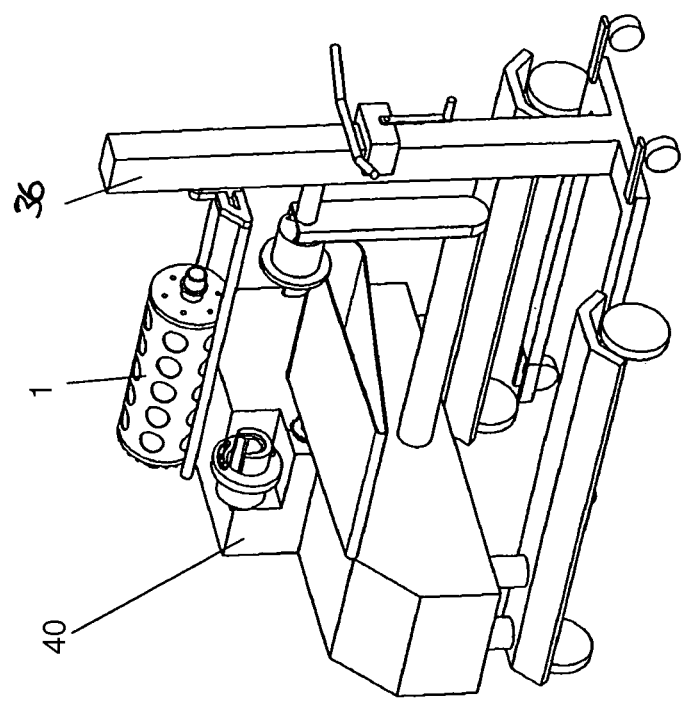
FIG. 14B
FIG. 14A

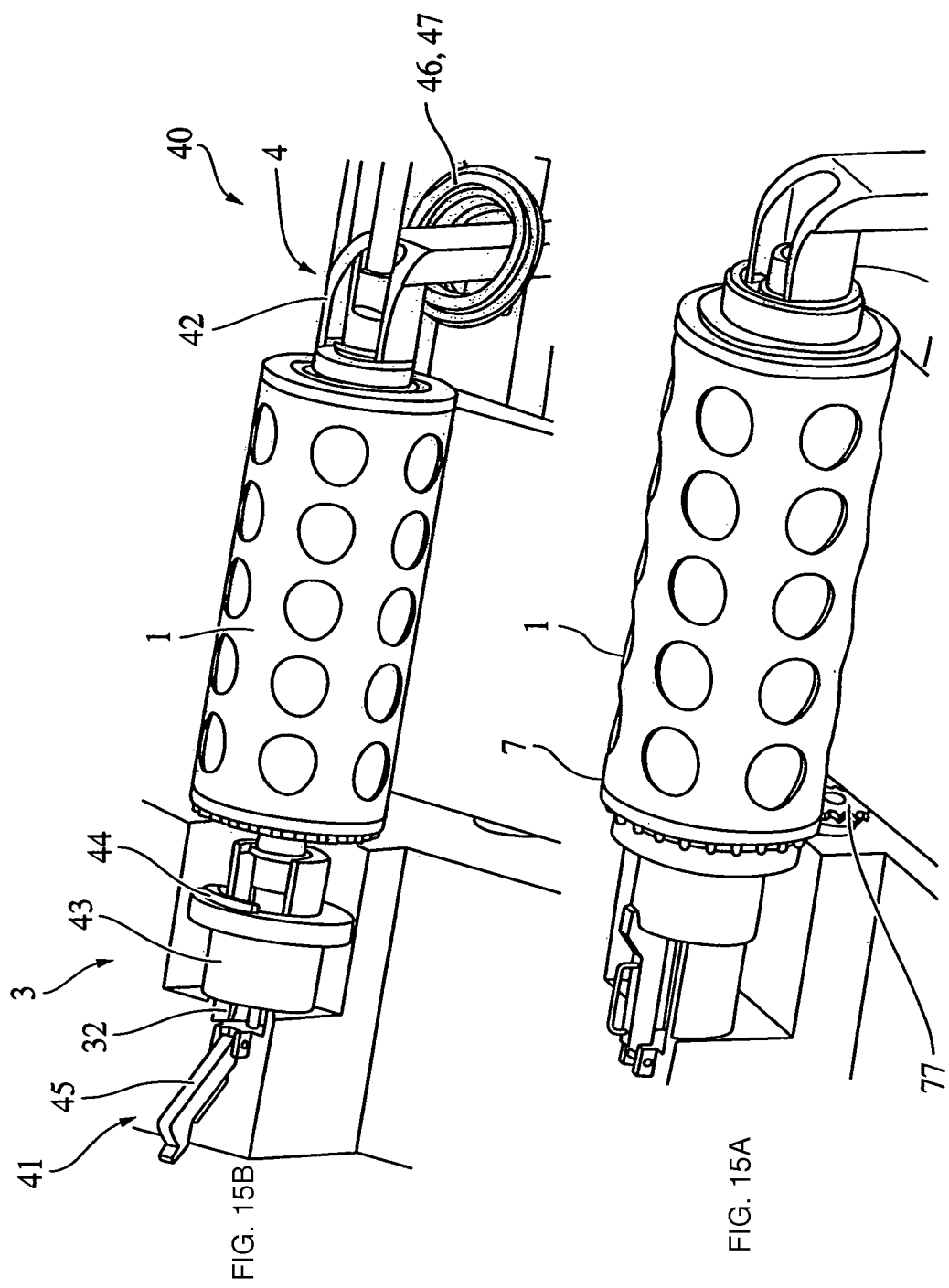

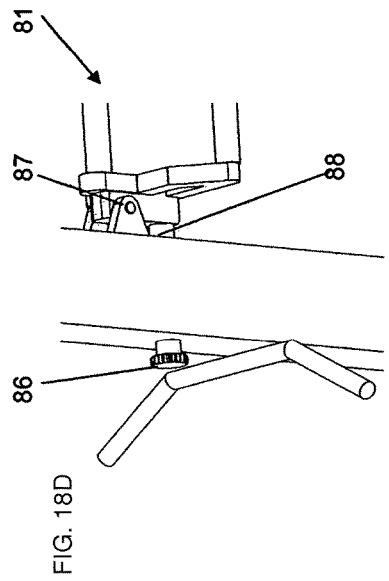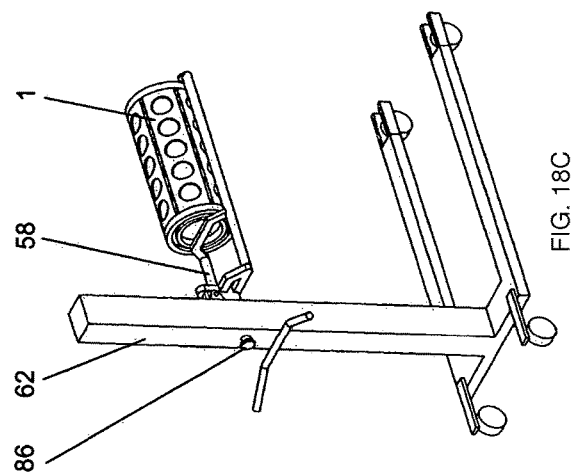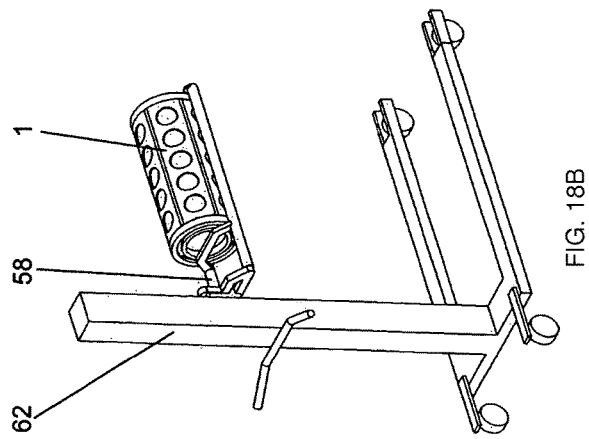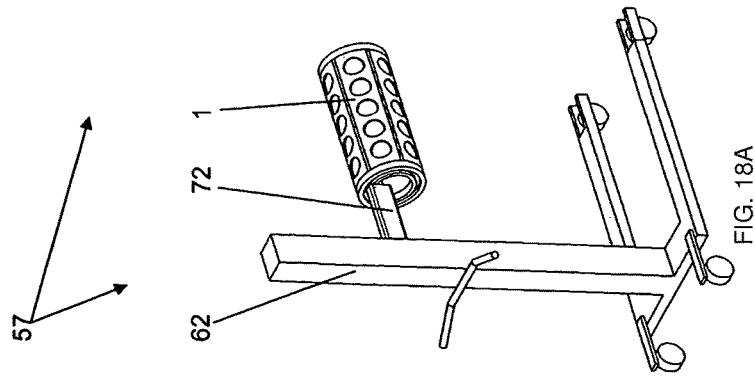

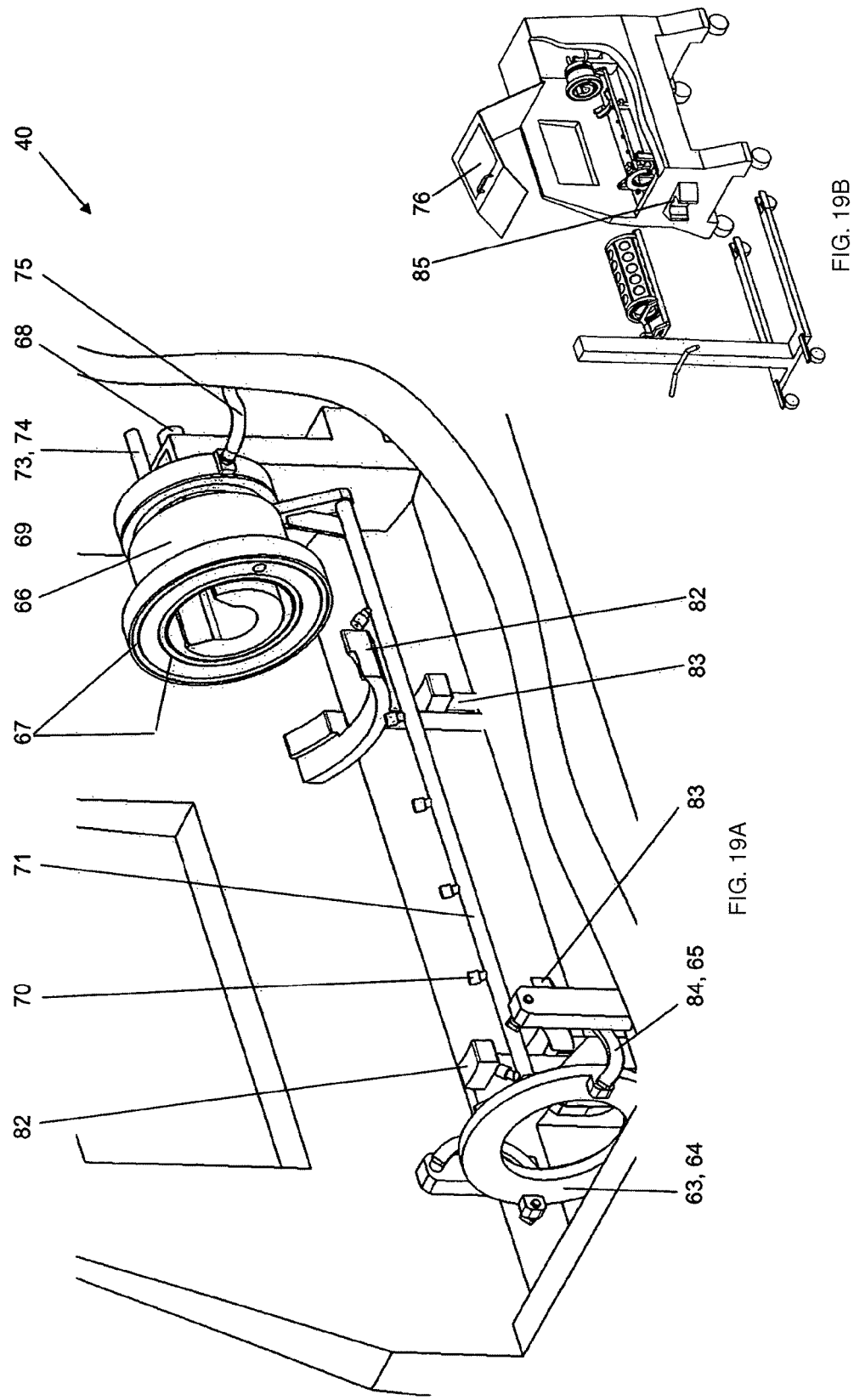

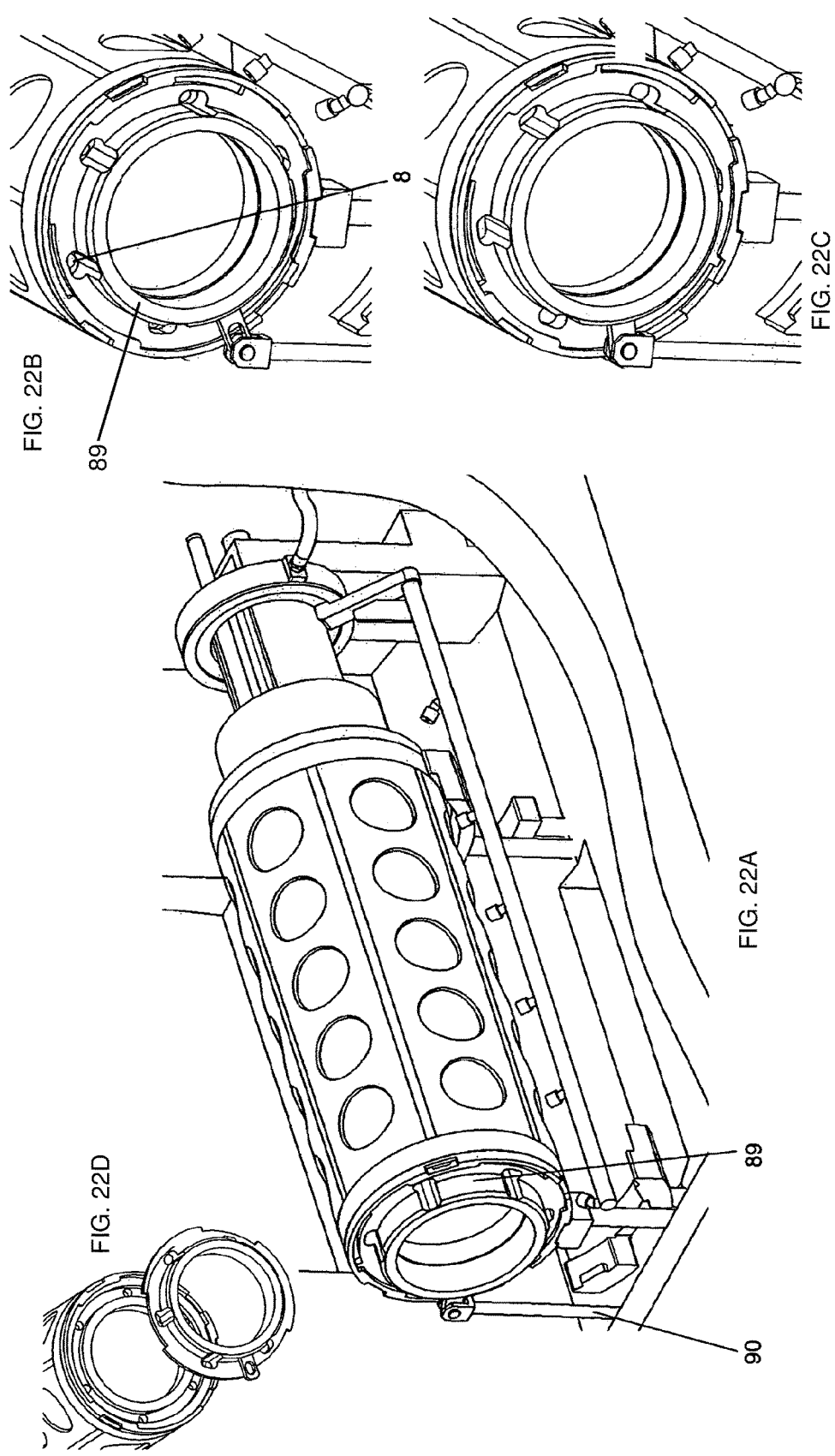

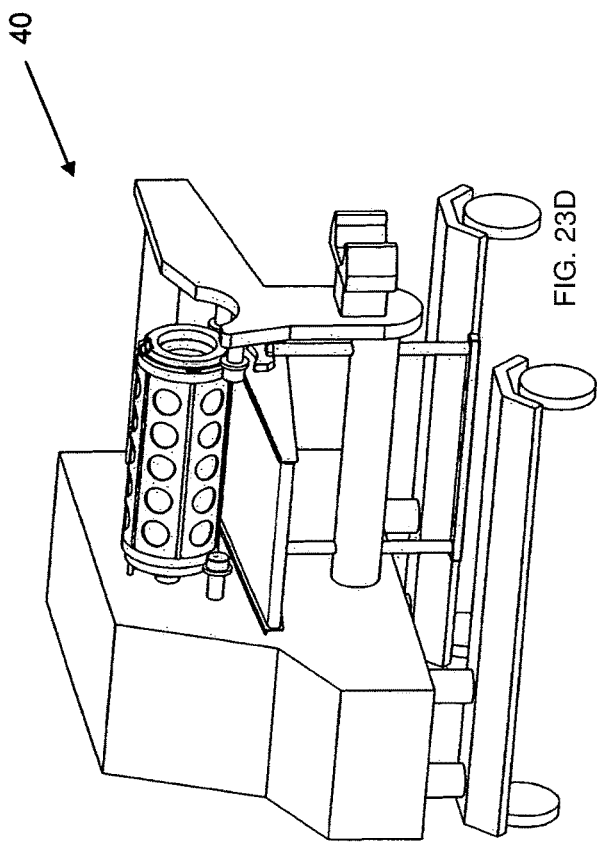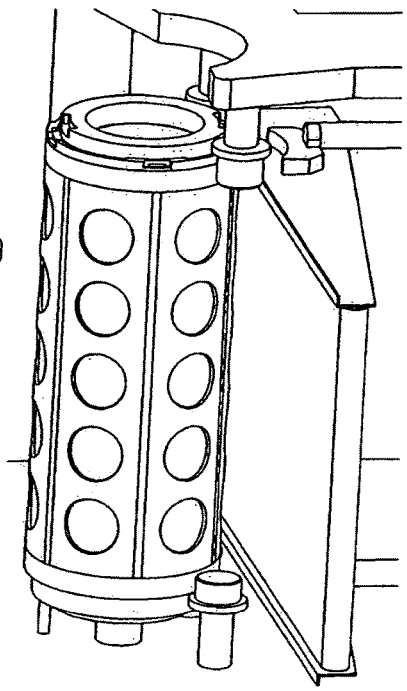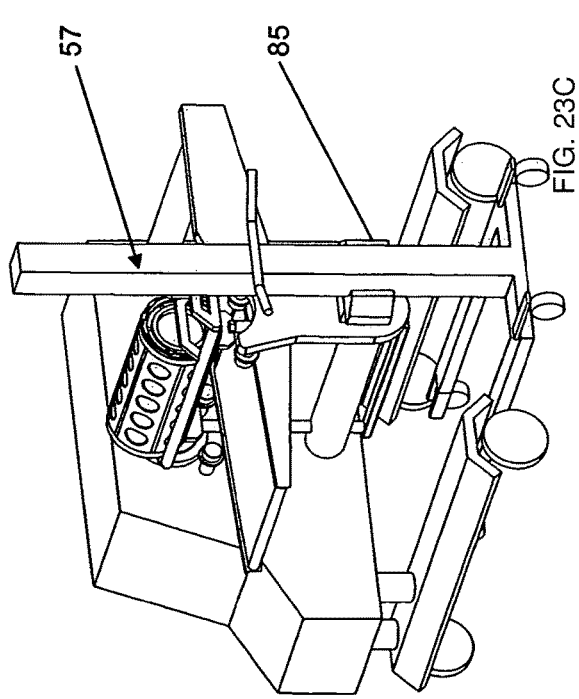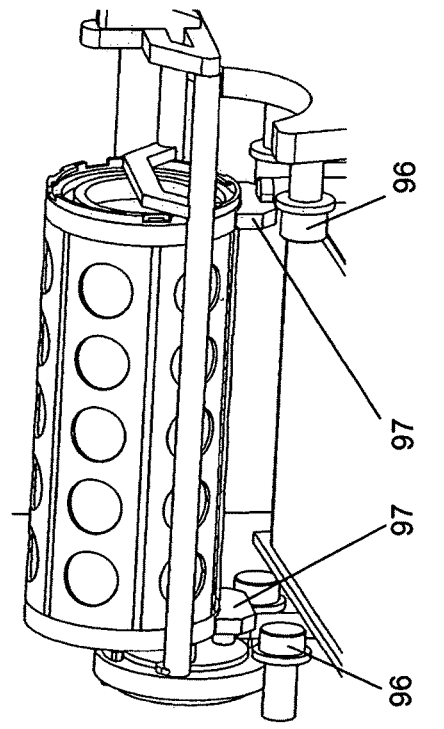
FIG. 23D
FIG. 23B
FIG. 23C
FIG. 23A

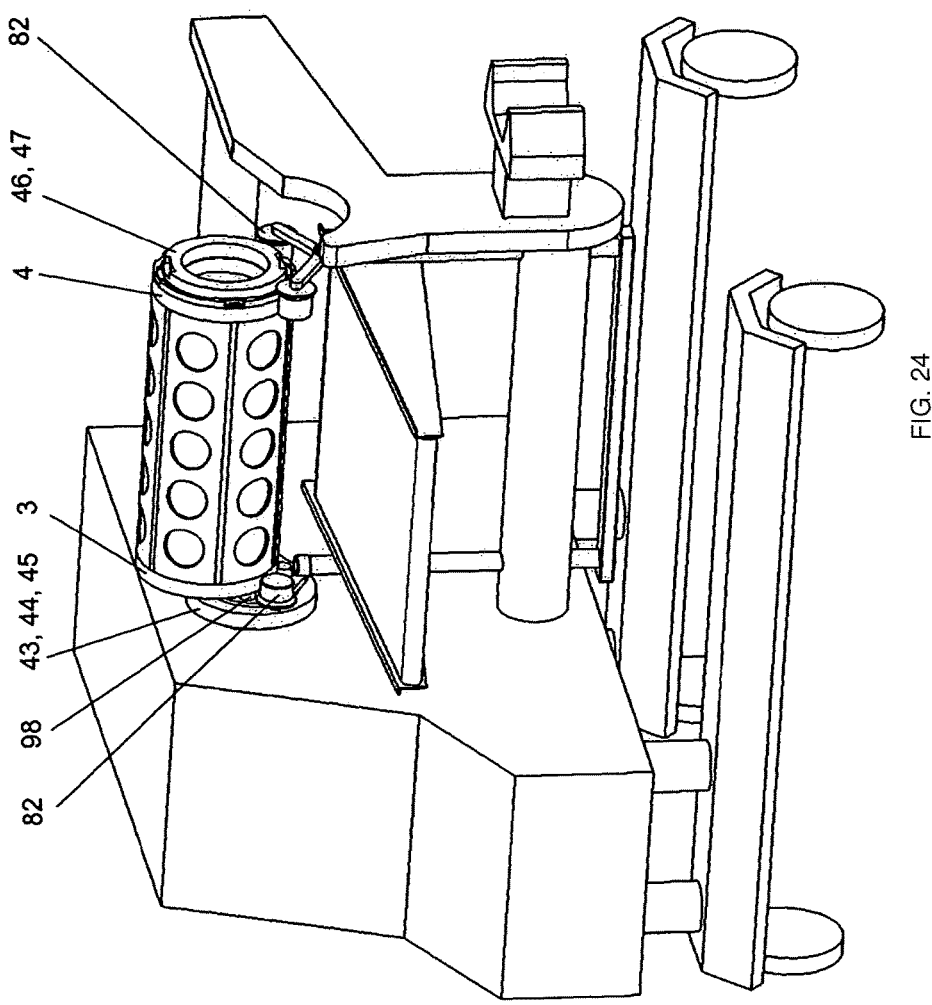

MOVABLE UNIT FOR TRANSPORT OF A MOULD DRUM AND METHODS THEREOF

FIELD

The present invention relates to a mould drum for moulding products from a mass of food starting material. The mould drum comprises one or more cavities with a mould cavity wall having at least partially a porous structure, whereas each cavity is connected to a passage. The present invention further relates to a cleaning apparatus for the inventive mould drum with supporting means for supporting the axis of the drum. Additionally, the present invention relates to a process for cleaning the inventive drum.

BACKGROUND

Hygiene is an important issue in the food processing industry. It is therefore important that machine parts, which are in contact with a food product, are cleaned regularly. Particularly, when using a drum with cavities with a porous structure for producing formed food products, the drum must be cleaned regularly and as soon as possible after the mould drum has been removed from the forming apparatus. If this is not done, for example dry meat will result in blocking of the pores of the porous cavity and will make it very difficult to clean these cavities.

From WO 2005/107481 A2, a mould drum is known, which can be cleaned. However, the cleaning of this mould drum is not sufficient. Furthermore, from this patent application, a cleaning apparatus is known, which is however rather complicated and results in an insufficient cleaning.

BRIEF SUMMARY

It was therefore the objective of the present invention to provide a mould drum, a cleaning apparatus and a process which do not have the deficiencies according to the state of the art.

This problem is attained with a mould drum for moulding products from a mass of food starting material, comprising one or more cavities with a mould cavity wall having at least partially a porous structure, whereas each cavity is connected to a passage, and whereas the passage extends from the first front end to the second front end of the mould drum.

In one embodiment, the present invention relates to a mould drum for moulding products from a mass of food starting material. Particularly, the present invention relates to a mould drum for forming meat, for example into two- or three dimensional patties. The mould drum comprises one, preferably more cavities, which are arranged on the surface of the drum. These cavities are preferably arranged around the entire circumference of the mould drum and a multitude of cavities are arranged in parallel; i.e. in rows. During the production, one row of cavities is filled and emptied simultaneously. During production, the drum rotates. Such a drum with porous cavities is and the respective food product forming device is for example disclosed in U.S. Pat. No. 3,427,649 or in U.S. Pat. No. 3,205,837. These references are herewith incorporated by reference and their disclosure is therefore part of the disclosure of the present patent application.

According to the present invention, each mould cavity has a cavity wall; i.e. sidewall and/or a bottom, which is at least partially porous so that the cavity wall is permeable for gas and/or a cleaning fluid. The porous structure is for example a sintered structure. The porous structure has a multitude of channels, which extend from one surface of the structure to the other surface of the structure. Preferably, the channels are interconnected. The drum can comprise one cylindrical element which is entirely made from a porous material. Alternatively, the drum comprises porous inlays. Preferably, only the bottom is made at least partially from a porous material.

Furthermore, according to the present invention, each cavity is connected to a passage, to vent the cavity during filling, provide pressurized gas in order to remove the product from the cavity and/or to supply a cleaning fluid to the cavity. Preferably, all cavities in one row are interconnected to each other by the passage. According to the present invention, this passage now extends from the first front end to the second front end of the mould drum, i.e. a cleaning fluid introduced at one front end can leave the drum at the other front end without being forced through the porous structure. This embodiment has the advantage that particularly during cleaning, the passage can be rinsed and food particles in the passage can be easily discharged from the passage.

Preferably, one front end comprises distribution means, preferably a ring, for distributing a cleaning- and/or drying fluid to all passages. This distribution means interconnects all passages so that the cleaning- and/or drying fluid only has to be provided to the mould drum once; i.e. to the distributor, which distributes the cleaning- and/or drying-fluid to all passages.

According to another preferred embodiment, the front end of the mould drum comprises form fit means to rotate the mould drum particularly during the production of the formed products. This form fit means can be for example a multitude of pins which are distributed equidistantly around the circumference of the front end.

In another preferred embodiment, the mould drum comprises an axis of rotation that extends from both ends of the mould drum. This extension can be utilized to bear the mould drum for example in the forming- and/or cleaning apparatus. Furthermore, these extensions can be utilized to transport the mould drum for example from the production apparatus to the cleaning apparatus and vice versa. The axis of rotation can be part of the front end of the mould drum, can be fixed to the front end of the mould drum and/or can extend through the entire center axis of the mould drum.

In another or a preferred embodiment of the present invention, the mould drum comprises a hollow axis of rotation and/or a hollow journal. This hollow axis of rotation and/or a hollow journal can be, for example, utilized to transport the mould drum, for example from the forming apparatus to a cleaning apparatus and vice versa.

Preferably, the mould drum comprises recognition means, preferably an RFID, with a read only- or a read- and write-function. The use of recognition means is advantageously in both, the forming apparatus and the cleaning apparatus to cleans the drum. It gives the opportunity to work with pre-programmed menus in both the forming apparatus and/or cleaning apparatus which results in quality assurance and faster changeovers. This program can be stored on the recognition means and/or on a control system which is part of the forming apparatus and/or the cleaning apparatus.

When a mould drum will be placed in the forming apparatus the system will recognize it and preferably process parameters, for example: filling pressure for the food mass, rotational speed of the drum, set points to control the fluid to the product cavities to remove the formed products, movement of the belt which remove the formed product from the drum, will be activated. Additionally, also the production history, for example at what time and date the mould drum has been used, standstill periods, temperature of the mass, operating times versus produced capacity, etc, of that particular mould drum in the forming apparatus can be monitored and stored. This information can be for example used to forecast production capacity and/or to proactively initiate service for the mould drum and/or the cleaning- or molding apparatus.

When the mould drum will be placed in the cleaning apparatus, the drum will be recognized and the individual cleaning process for the particular drum will activated. The cleaning program can consist settings like the amount of detergents which are needed, time period of each cleaning step within the cleaning process. Also the cleaning history of the drum can be monitored. This is especially important due to the hygienic demands for food forming processes.

In case a mould drum with cavities made from porous material is used, it is advantageous, to clean the mould drum shortly after the production period, to prevent that the openings within the material get clogged. By storing one or more of the above mentioned data into a memory of the forming apparatus and cleaning apparatus and/or in centrally organized memory, it is, for example, afterwards possible to analyze if a problem with a mould drum is related to for example a failed cleaning process.

Preferably, the drum is stored in a storage unit. This storage unit can also be provided with recognition means to control the logistics with respect to mould drums. The forming apparatus, cleaning apparatus and storage unit can be coupled together for a centralized control of the handling of the mould drums. In a preferred embodiment with more tracking- and tracing technology, it will be known which drum is in the forming apparatus, which drum is in the cleaning apparatus, which drums are in the storage unit and even the settings wherewith the forming apparatus and cleaning apparatus are working can be monitored and eventually from a central point be changed. The history of the mould drum with respect to the cleaning apparatus and forming apparatus is also available. A secured central control over the configuration of the production line can be achieved by coupling all used machines together.

Identification means in the mould drum can for example be milled grooves which grooves comprise a code which can be recognized by recognition means, for example, machine readable holes forming an unique number, a barcode, a transponder (electronic tag, radio tag, RFID chip) or other identification means are also possible.

The recognition means connected to the forming apparatus and/or cleaning apparatus is a read- and/or write means which is capable to read the identification means which is part of each mould drum and/or write information on the recognition means of the mould drum.

The used technique recognition means must withstand the circumstances during the forming process, during the cleaning process, during storage and/or during further handling of the mould drum. Especially the cleaning process where the drum is accommodated within the housing of a cleaning apparatus, the drum will be exposed to detergents, acids, high pressure washing and/or high temperature. To prevent that the identification means placed at/in the mould drum and the recognition means placed at the forming apparatus, cleaning apparatus and/or eventually storage unit will be damaged, they are preferably placed in a protected place and/or integrated in plastic parts.

Another subject matter of the present invention is an apparatus for the inventive mould drum with supporting means for supporting the axis of the mould drum, whereas the cleaning apparatus comprises cover- and fastening means, which fastens the mould drum to the supporting means and/or covers one or both front ends of the mould drum.

The disclosure regarding the inventive mould drum also applies to the inventive apparatus and vice versa.

This embodiment of the present invention relates to an apparatus for example for cleaning a mould drum from the inside; i.e. particularly the passage and/or the cavity and/or from the outside. This embodiment of the present invention further relates to a forming apparatus in which the drum is utilized to form food products from a food starting material.

According to the present invention, the apparatus comprises supporting means for supporting the axis of the drum, which preferably does not rotate during the cleaning process and preferably rotates during the production process. Preferably, the axis of the drum fits on and/or in the supporting means and is at least partially secured in its position. For example, the supporting means can be utilized by a segment of a cylindrical sidewall of a tube.

Furthermore, the apparatus comprises cover and/or fastening means, which fasten the mould drum to the supporting means and/or cover the front end of the mould drum, at least partially. By covering one front end of a mould drum, one end of the passage can be closed and/or two passages can be fluid-wise interconnected by the cover. Additionally or alternatively, the cover can be connected to an fluid to eject the formed product, a cleaning- and/or drying fluid source to introduce a cleaning- and/or drying-fluid via the front end into the passage of the mould drum and force the cleaning- and/or drying-fluid through the porous structure and thus clean and/or dry it. Preferably, the cover- and the fastening means comprise sealing means to avoid that particularly ejection-, cleaning- and/or dry-fluid leaks unintentionally from one of the front ends.

In another preferred embodiment, the cover and/or fastening means comprise drive means to move them from a fastening into a remote position and vice versa and preferably secure it in at least one of its respective position. These drive means can be operated by a motor and/or manually. This preferred embodiment of the present invention has the advantage that the mould drum can be placed on the support means of the apparatus. Subsequently, first one and then the second cover and/or fastening means can be automatically placed against the front end of the mould drum in order to secure the mould drum in its position and/or in order to clean the passages and/or the cavities.

In another preferred embodiment, one cover and/or fastening means comprise an ejection-, cleaning- and/or drying-fluid connection to provide an ejection-, a cleaning- and/or drying-fluid to the passage and/or the cavity. Via the cover, the cavity can also be vented during filling of the cavity.

Additionally, in case the apparatus is a cleaning apparatus, it comprises preferably a nozzle that rotates around the drum in order to clean the circumference and/or the front end of the drum. The nozzle can be motor driven and/or driven by the emerging cleaning fluid jet.

According to a preferred or another embodiment of the present invention, the apparatus comprises means to move, preferably lower and/or lift the mold drum relative to the frame of the apparatus. This means can be utilized to press the drum against a seal in the vicinity of the filling area of a mass feed member. Furthermore, this means can be utilized to remove the mould drum from a movable unit and/or place it into the apparatus. Additionally, this means can be used to change the vertical and/or horizontal position of the mould drum during cleaning and/or to remove the remove the means, on which the mould drum rests, from the drum.

Preferably, the mould drum comprises a read/write unit which communicates with the recognition means of the mould drum.

Another subject matter of the present invention is a process for the cleaning of the inventive mould drum in the inventive cleaning apparatus, whereas the passages are rinsed from the first front end to the second front end.

The disclosure regarding the mould drum and/or the cleaning apparatus also applies to the inventive process and vice versa.

According to a preferred or another embodiment of the inventive process for cleaning a mould drum is moved, preferably lowered and/or lifted prior, during and/or after cleaning and/or that support means (82, 83) are removed from the drum during cleaning and vice versa.

According to the present invention, the passages are rinsed from the first front end to the second front end. This embodiment of the inventive process has the advantage that food particles, which are inside the passage, are removed from the passage and not forced into the porous structure of the cavities.

In a preferred embodiment, the cavities are rinsed with a cleaning fluid after the passage has been cleaned. Particularly after the passage has been cleaned, the opening of the passage in one front end will be closed so that the fluid introduced into the passage has to flow through the porous structure of the cavity and thereby cleans the porous structure.

In another preferred embodiment, the passage and/or the cavity is dried after cleaning. This is preferably utilized by introducing air into the passage, which preferably firstly removes water from the passage and then dries the cavity.

In a preferred embodiment, the outside of the drum is cleaned by a rotating nozzle. This embodiment of the present invention has the advantage that the drum stands still during the cleaning process. In another preferred embodiment, the front ends are cleaned before the passage and/or the cavity is rinsed. This preferred embodiment of the present invention has the advantage that the front ends are already cleaned before they are covered by a cover.

Another subject matter of the present invention is a movable unit to transport the mould rum according to one of the preceding claims, whereas it comprises a fork and/or a spindle to bear the mould drum.

In case a drum is transferred from or to the storage unit, for example with a movable unit with lifting means, the storage unit can be designed as a relatively simple rack which can be provided with protection means, for example plastic shoe shaped part, to prevent that the surface of the drum will be damaged. The storage unit can accommodate multiple drums. The storage unit is preferably provided with a positioning means to assure a trouble free placement and removal of the mould drum with the movable unit.

In case a movable unit is provided without lifting means, the storage unit must be provided with lifting means to lift the mould drum from the movable unit or to put the mould drum on the movable unit. Only a small movement in vertical direction is needed for transferring the drum. All the lifting means described in the several embodiments of the cleaning apparatus and forming apparatus can also be used for the storage unit. These lifting means can be driven pneumatically, with an electric motor but preferably manually so no pneumatic or electric connection to the storage unit is needed. In a manually operated system, the mould drum supports in the storage unit can be moved by for example by a lever mechanism which makes only a rotating movement around a pivoting point to overcome the height difference. Other designs like lever mechanisms which can make a rotating movement and/or a linear movement and a spindle driven unit are possible too. Every mould drum storage location can have its own lifting means but it's also possible that multiple drum locations are operate with one lifting means. The storage unit can be designed such that there is a restricted area wherein at least the outside of at least one drum can be washed with a high pressure washer without splashing meat particles etcetera to the already cleaned and stored drums. This can be useful when the production of food products stops only for a short period of time and especially the outside of the mould drum has to be cleaned before the next production run will start.

The present invention is now explained according to the figures. These explanations do not limit the scope of protection. The explanation applies to all embodiments of the present invention, respectively.

BRIEF DESCRIPTION OF THE DRAWINGS

FIG. 1A shows a perspective view from a first end of a mould drum according to the teachings herein.

FIG. 1B shows a perspective view from a second end of a mould drum according to the teachings herein.

FIG. 1C is an illustrative perspective view from one end of a mould drum according to the teachings herein.

FIG. 1D is an illustrative perspective view from a different end of a mould drum according to the teachings herein.

FIG. 1E is a sectional view of a mould drum according to the teachings herein.

FIG. 3A shows illustrative features of a cleaning apparatus according to the teachings herein.

FIG. 3B shows illustrative features of a cleaning apparatus according to the teachings herein.

FIG. 3C shows illustrative features of a cleaning apparatus according to the teachings herein with a mould drum.

FIG. 4A is a perspective view of a cleaning apparatus according to the teachings herein having a cover with part of the cover cut-away.

FIG. 4B is a perspective view of a cleaning apparatus according to the teachings herein with a cover opened.

FIG. 4C is a perspective view showing illustrative features of a cleaning apparatus according to the teachings herein with a mould drum.

FIG. 4D is a perspective view showing illustrative features of a cleaning apparatus according to the teachings herein with a mould drum.

FIG. 4E is a front view showing illustrative features of a cleaning apparatus according to the teachings herein with a mould drum.

FIG. 5A shows an illustrative perspective view of a moveable unit carrying a mould drum and a cleaning apparatus according to the teachings herein. A portion of a cover of the cleaning apparatus is cut-away.

FIG. 5B shows an illustrative perspective view of a moveable unit and a cleaning apparatus according to the teachings herein with the mould drum in the cleaning apparatus. A portion of a cover of the cleaning apparatus is cut-away.

FIG. 6A is perspective view of an illustrative moveable unit holding a mould drum in proximity of a cleaning apparatus.

FIG. 6B is a perspective view showing illustrative features of a mould drum being placed in a cleaning apparatus.

FIG. 7A is a perspective view showing illustrative features of a mold drum placed in a cleaning apparatus having an open cover.

FIG. 7B is a perspective view showing illustrative features of a cleaning apparatus having a closed cover.

FIG. 9A is a perspective view of an illustrative cleaning apparatus according to the teachings herein with a cut-away of a cover.

FIG. 9B is a perspective view of an illustrative mould drum according to the teachings herein showing a first end.

FIG. 9C is a perspective view of an illustrative mould drum according to the teachings herein showing a second end.

FIGS. 9D and 9E are perspective views of an illustrative cleaning apparatus with a mould drum according to the teachings herein.

FIG. 9F is a side view of an illustrative cleaning apparatus and mould drum according to the teachings herein.

FIG. 10A is a perspective view showing a moveable unit and a cleaning apparatus with a mould drum held by the moveable unit according to the teachings herein.

FIG. 10B is a perspective view showing a moveable unit and a cleaning apparatus with a mould drum held by the cleaning apparatus according to the teachings herein.

FIG. 11A is a perspective view of a mould drum in a cleaning apparatus according to the teachings herein at a time when the front ends of the mould drum are not covered or sealed by the cleaning apparatus.

FIG. 11B is a perspective view of a mould drum in a cleaning apparatus according to the teachings herein at a time when one of the front ends of the mould drum is covered and/or sealed by the cleaning apparatus.

FIG. 11C is a perspective view of a mould drum in a cleaning apparatus according to the teachings herein at a time when both of the front ends of the mould drum are covered and/or sealed by the cleaning apparatus.

FIGS. 12-17 show different embodiments of the forming apparatus.

FIG. 12A is a perspective view of a forming apparatus including a mould drum according to the teachings herein.

FIGS. 12B and 12C are perspective views showing features of a forming apparatus according to the teachings herein including bearings on each front end of the mould drum and a support frame.

FIGS. 13A and 13A1 are illustrative perspective views showing features of a moveable unit according to the teachings herein carrying a mould drum.

FIGS. 13B and 13B1 are illustrative perspective views showing features of a moveable unit according to the teachings herein carrying a mould drum.

FIG. 13C is an illustrative perspective views showing features of a moveable unit according to the teachings herein carrying a mould drum.

FIG. 13C1 is an illustrative perspective view showing features of a moveable unit according to the teachings herein with a forming apparatus and a mould drum.

FIG. 14A is an illustrative perspective view showing features of a moveable unit according to the teachings herein with a forming apparatus and a mould drum.

FIG. 14B is an illustrative perspective view showing features of a moveable unit according to the teachings herein with a forming apparatus and a mould drum.

FIG. 15A is a perspective view of a forming apparatus according to the teachings herein with a mould drum having ends sealed and/or covered.

FIG. 15B is a perspective view of a forming apparatus according to the teachings herein with a mould drum at a stage when the ends are not sealed or covered.

FIGS. 18A, 18B, 18C, and 18D are perspective views showing illustrative features of moveable units according to the teachings herein.

FIG. 19A is a perspective view showing illustrative features of a cleaning apparatus according to the teachings herein.

FIG. 19B is a perspective view showing illustrative features of cleaning apparatus according to the teachings herein. Also shown is a movable unit carrying a mould drum.

FIGS. 22A, 22B, 22C, 22D, 22E, and 22F are perspective views showing illustrative features of a cleaning apparatus and a mould drum including features related to the covering of front ends of the mould drum.

FIGS. 23A, 23B, 23C, and 23D are perspective views showing illustrative features of a forming apparatus according to the teachings herein. The apparatus may include lifting and/or support means for placing, removing and/or supporting the drum.

FIG. 24 is a perspective views showing illustrative features of a forming apparatus according to the teachings herein. The apparatus may include lifting/support means for placing, removing and supporting the drum.

DETAILED DESCRIPTION

Figure 2A:
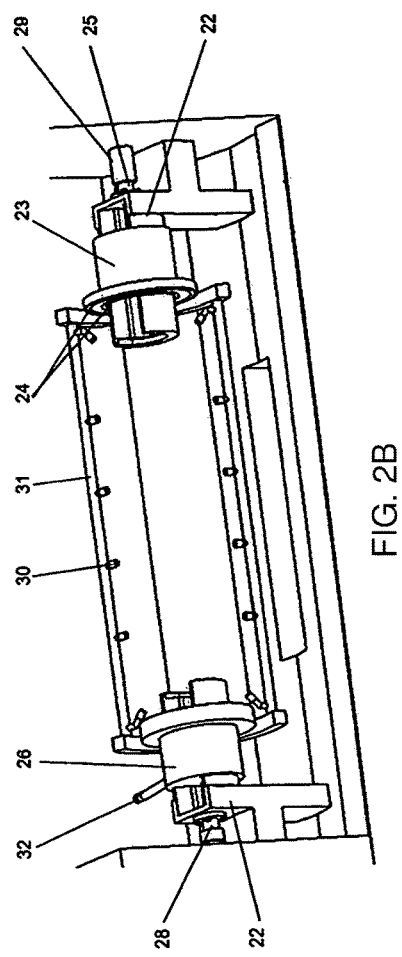
FIG. 2A is a perspective view of a first embodiment of a cleaning apparatus according to the teachings herein.
Figure 2B:
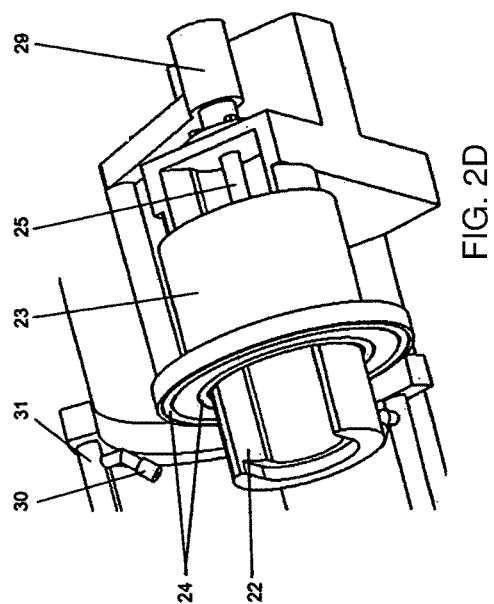
FIG. 2B shows illustrative features of a cleaning apparatus according to the teachings herein.
Figure 2C:
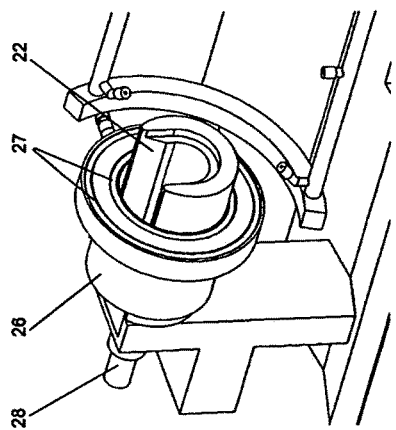
FIG. 2C shows illustrative features including a first support frame and sealing means of a cleaning apparatus according to the teachings herein.
Figure 2D:
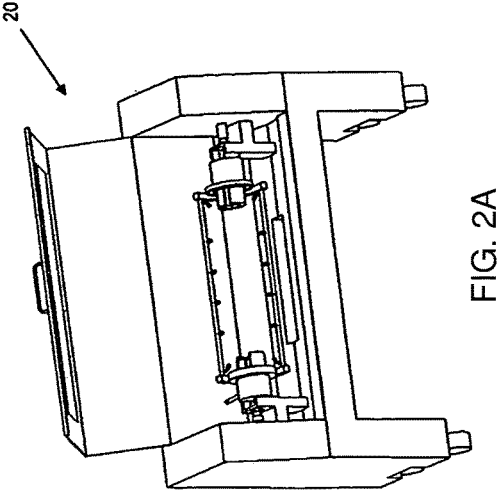
FIG. 2D shows illustrative features including a second support frame and sealing means of a cleaning apparatus according to the teachings herein.
Figure 6A:
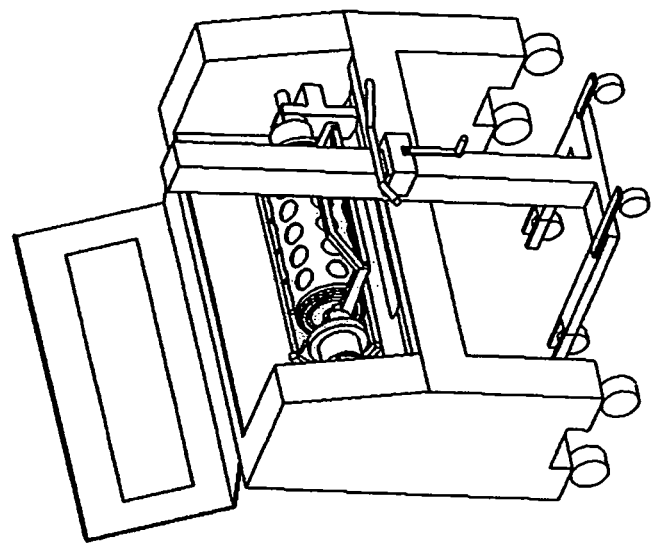
FIGS. 6A, 6B, 7A, and 7B shows a concept for loading a mould drum into the cleaning apparatus.
Figure 6B:
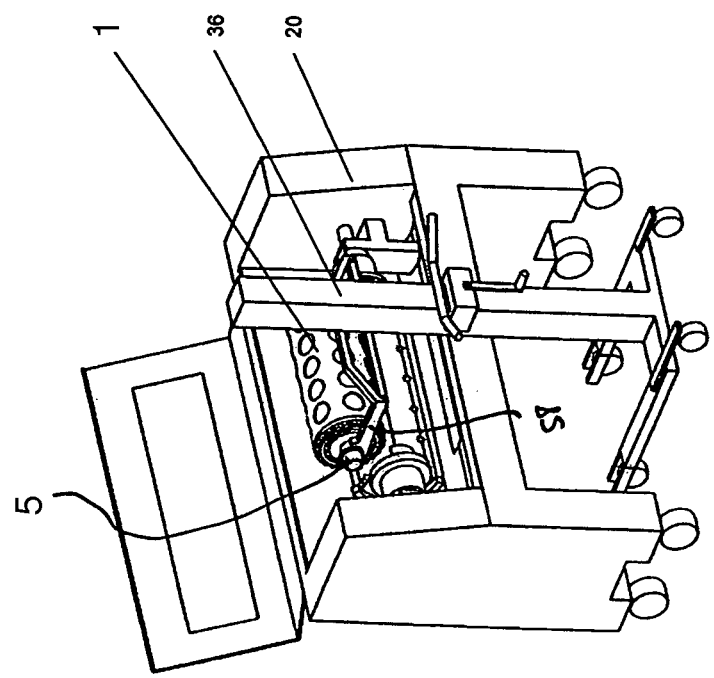
Figure 7B:
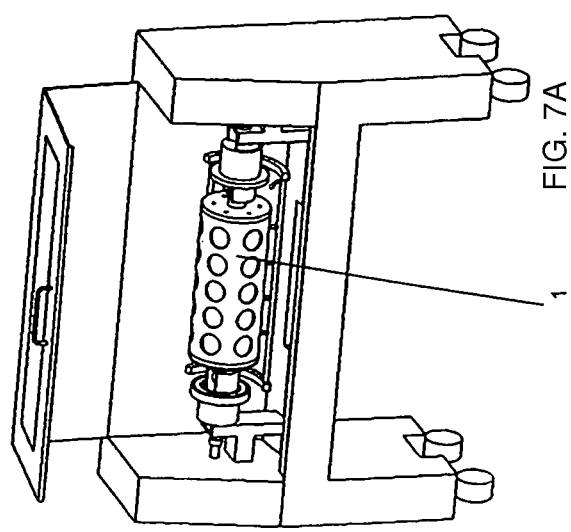
Figure 7A:
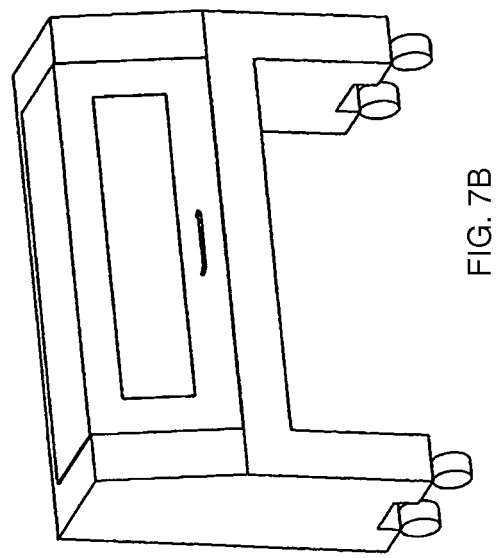
Figure 8A:
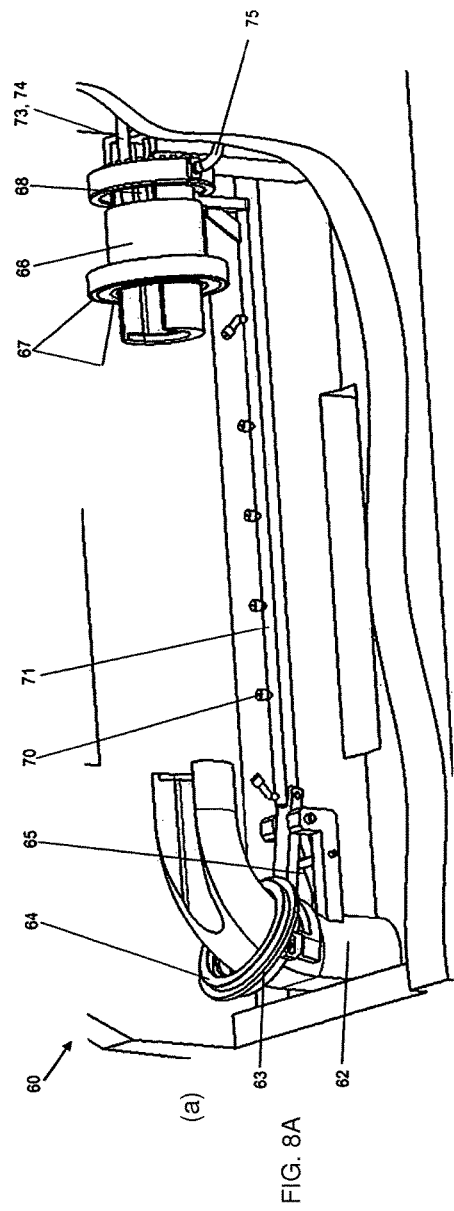
FIG. 8A is a perspective view showing illustrative features of a cleaning apparatus according to the teachings herein including covering means for the axial ends of the mould drum.
Figure 8C:
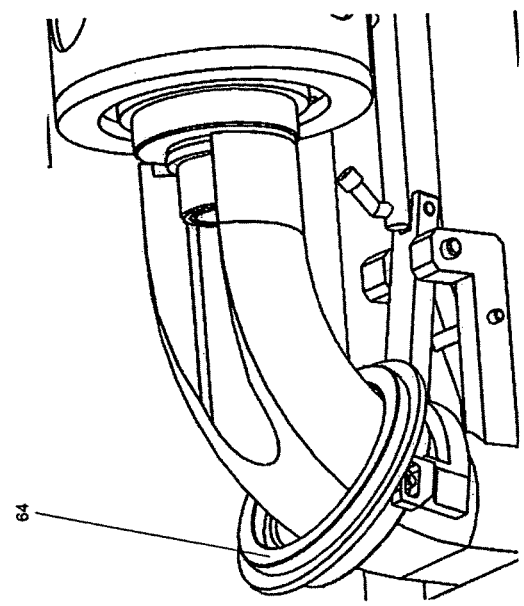
FIG. 8C is a perspective view showing illustrative features of a cleaning apparatus at one axial end of a mould drum.
Figure 8B:
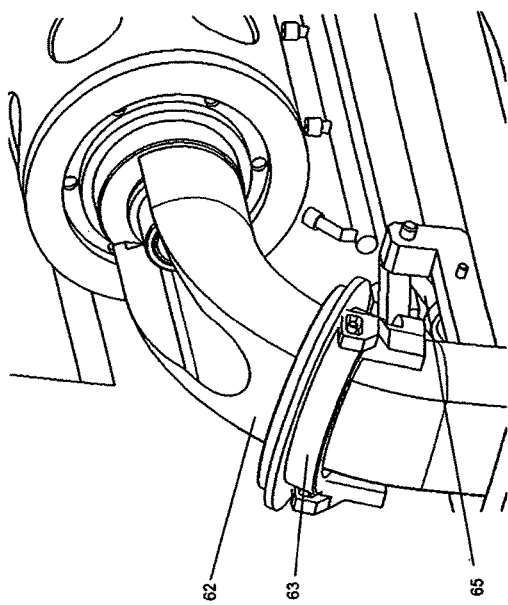
FIG. 8B is a perspective view showing illustrative features of a cleaning apparatus at one axial end of a mould drum.

FIGS. 1A, and 1B shows the inventive mould drum 1 with a first front end 3 and a second front end 4. This mould drum 1 comprises on its surface a multitude of cavities 2, which are arranged around the entire circumference and which are open towards the surface. These cavities are utilized to form a food mass, preferably a meat mass into a desired 2D- or 3D-form, for example a patty. Additionally, along its axial extension, the mould drum comprises a multitude of cavities which are arranged in parallel. In the present case, one row of cavities comprises five cavities 2, which are filled simultaneously and emptied simultaneously. During production, each cavity is filled with a food starting material, particularly with meat. Subsequently, this 2D- or 3D-formed product is removed from the cavity. During the production, the drum rotates. Each cavity comprises at least partially a porous structure; i.e. a at least partially porous bottom and/or a at least partially porous sidewall. This porous structure can be utilized to vent the cavity during filling, to apply pressurized air to the cavity to remove the product from the cavity and/or to clean the porous structure. All cavities 2 are connected to a passage 8, through which the cavities are vented and/or air or cleaning fluid is supplied. According to the present invention, this passage extends from the first front end 3 of the drum to the second front end 4 of the drum. On one front side, here on the left front side 3, the inventive mould drum further comprises a distributor 9, here a ring-shaped groove, in order to supply a cleaning fluid to all passages 8 simultaneously, which are fluid-wise connected to the distributor. Furthermore, form fit means 7, here embodied as pins, are arranged on the circumference of the front end 3 which are utilized to rotate the drum particularly during production. From the first front end 3 and the second front end 4 an axis of rotation 5 extends, respectively, which is used to bear the mould drum during its rotation in the production device and/or to bear the drum during its cleaning and/or to transport the drum. If needed, bearings 6 are fixed to the axis of rotation 5.

FIGS. 1C, 1D, and 1E shows another embodiment of the inventive mould drum 1. The mould drum has in a preferred embodiment a stainless steel base with fixedly placed inserts which inserts are partly or completely made from material with a porous structure. The mould drum is provided with a multitude of product cavities 2 which are arranged around the entire circumference of the mould drum and which form a row of cavities in longitudinal direction of the drum and which are open towards the surface and are utilized to form a food mass into a product, for example a patty. The mould drum has a first axial front end 3 and a second axial front end 4. Every row of product is provided with at least one passage 8 through which the cavities are vented and/or cleaning fluid is supplied. Each passage preferably extends from the first axial front end 3 to the second front end 4. A distributor 9 for a pressurized fluid is preferably integrated in first frond end 3. The mould drum has a relatively large internal opening 80. Further form-fit means 7 are provided to drive the drum in the forming apparatus. Here the form-fit-means are located within the opening 80, so that they are protected and cannot be, for example, contaminated by the food mass.

FIG. 1D shows a preferred location for identification means 12 at mould drum 1. Preferably the identification means 12 at the drum should be provided in first front end 3. The drum can be provided with more than one identification means 12 to prevent that the forming apparatus or cleaning apparatus can recognized the mould drum only by means of one identification means 12 and/or to prevent that there is only one pre-determined position wherein the drum will be recognized by the forming apparatus or cleaning apparatus.

Via a mass supply system (not depicted), a food mass will be transported to a mass feed member provided with a fill opening adjacent to the mould drum 1. When a row of cavities in the drum is at least partially congruent with the fill opening, the mass, which is pressurized with relatively low pressure, will flow into the open cavities. During filling the air within the cavities preferably escapes via the porous structure of the bottom 10 and when applied, the porous structure of the sidewalls 11. The air will escape out of the drum via passages 8. During further rotation of the drum a seal will preferably keep the formed products within the cavities till the row of formed products is approaching for example the lowest position of the drum. This is the moment that the formed products have to be removed from the cavities by using a fluid, preferably air, under excess pressure. Removing of the products can be done in several ways. When the product cavities are provided with a porous bottom 10 and side wall 11 has a closed structure, fluid only has to be provided in a passage 8 which is directed to the porous bottom 10. When the product cavities are provided with a porous bottom 10 and a porous sidewall 11, fluid can to be provided to both the bottom wall and/or sidewall. When using one passage 8 per row of cavities the porous cavities can be designed such that the fluid flow exits the porous structure of the bottom 10 and sidewall 11 at the same time.

FIG. 1E shows an example of a cross view of a mould drum, wherein 2 passages will be used, one separate passage 8a for the bottom and one separate passage 8b for the sidewall. Several options how to provide a pressurized fluid to the bottom and/or the sidewall are preferred. Fluid can exit the porous structure of the bottom and sidewall essentially at the same time, by directing the fluid to both passages 8a, 8b simultaneously. Fluid can be directed first to a passage 8b, which is connected to the porous structure of the sidewall and at least partially afterwards fluid can be directed to a passage 8a, which is connected to the porous structure of the bottom. Alternatively, fluid can be directed first to a passage 8a, which is connected to the porous structure of the bottom, and at least partially afterwards, the fluid is directed to a passage 8b which is connected to the porous structure of the sidewall.

When using large products even more than two passages per row of product cavities can be used to improve the control of removing the formed products out of the product cavities.

FIGS. 2A, 2B, 2C, and 2D show a first embodiment of the cleaning apparatus 20. This cleaning apparatus comprises a support frame 22, which is embodied in the present case as a partial segment of a cylindrical tube. Into this support frame, the axis of rotation 5 of the mould drum (please compare FIGS. 1A and 1B) is placed. On each side, the inventive cleaning apparatus comprises cover- and fastening means 23, 26 which are axially movable. After the drum has been placed into the support frames, the cover- and/or fastening means 23, 26 are moved towards the drum, until they are in contact with the respective front end. Drive means 25, 28, preferably motor drive means can be utilized for this movement particularly in order to automatize the cleaning process. The person skilled in the art understands, however, that the means 23, 26 can also be moved manually. Preferably, the means 23, 26 are moved one after the other, which will be described in more detail according to FIGS. 11A, 11B, and 11C. At their contact side with the drum, each cover- and/or fastening means 23, 26 comprises sealing means 24, 27 in order to avoid undesired leakage particularly cleaning- and/or drying-fluid leakage between the drum and the cover 23, 26. During cleaning, the mould drum is stationary and a distributor, here a spray bar 31, with a multitude of nuzzles 30, rotates around the drum. The distributor 31 can be motor driven and/or can be rotated by the impulse of the jet that emerges each nozzle 30. The cleaning fluid sprayed on the outside of the drum cleans the surface of the drum and the surface of the cavity. Furthermore, the cover- and/or fastening means 26 comprises a cleaning fluid connection 32. Through this cleaning fluid connection 32, a cleaning fluid is introduced into the cover and flows from there to the distribution groove 9, which is connected to all passages 8 of the mould drum. Thus, the passages 8 and/or the porous structure of the cavity can be cleaned which will be explained in further detail later on. FIG. 2A shows the inventive cleaning apparatus 20 in its entirety. In the present case, a hood can be opened, which extends essentially over the entire length of the cleaning apparatus in order to place the mould drum into the support frame 22.

FIGS. 3A, 3B, and 3C show further details of the inventive cleaning apparatus according to FIGS. 2A, 2B, 2C, and 2D. As can be particularly seen from FIG. 3B, in the present case, the cleaning apparatus comprises drive means 49, 52 in order to rotate the spraying means 50, 51. At the end of a rotating axis 49, a pinion 52 is arranged, which drives form-fit-means, here pins associated with the spray bar structure 51 to rotate the spray bar structure 51. Besides the cleaning fluid connection 54, also an air source connection 53 is provided in the cover 46, which forces air into the distributor and thus into the passages and the cavities in order to dry the passages and the cavities. As can be particularly seen from FIGS. 4A, 4B, 4C, 4D, 4E, 5A and 5B, the mould drum can also be loaded into the cleaning unit from one of the front ends of the cleaning device 40. For the loading of the mould drum into the cleaning device, a movable unit is used, which comprises a fork 58, which is height adjustable and on which the drum is placed so that the circumference of the drum sits on the fork 58. The fork 58 together with the drum is inserted into the cleaning unit 20 after the cleaning unit has been opened and then the fork 58 is lowered and the mould drum is placed on the support frame 42. Subsequently, the movable unit 57 is removed from the cleaning unit and the hood can be closed. The cleaning process can be inspected via a window 56.

There can be separate tanks for cleaning agents, descaler and disinfectant, pumps for spray nozzles and/or for internal cleaning drum filters. The valves for controlling the cleaning fluid can be operated by a PLC.

In FIGS. 6A, 6B, 7A and 7B an alternative loading process is depicted. In the present case, the mould drum is loaded from the front side. In the present case, the axis of rotation 5 sits on the fork 58 and is then lowered into the support frame 52. Subsequently, the movable unit 36 is removed from the cleaning unit, the hood is closed and the cleaning process can start.

Since, in all applications the drum is not gripped by the movable unit, but sits on a fork, the movable unit is produced and operated easily. The drum is not damaged during transportation and/or insertion of the drum into the cleaning apparatus and/or into the cleaning apparatus.

FIGS. 8A, 8B, 8C, 9A, 9B, 9C, 9D, 9E, 9F, 10A and 10B show an alternative embodiment of the inventive cleaning unit. As can be particularly seen from FIGS. 8A, 8B and 8C, the cover 63 is rotatable for example by motor means 65 or manually. Other than that, reference is made to the description of the other figures. As can be particularly seen from FIGS. 10A and 10B, the drum is loaded in the present case by a movable unit, which comprises a spindle 72, which can be inserted into the axis of rotation 5 of mould drum. After the mould drum has been placed on the support frame 62, the movable unit and thus the spindle is removed from the drum. The person skilled in the art understands that in the present case also a fork can be used to place the mould drum into the cleaning unit.

The person skilled in the art understands that the cover- and/or fastening means can also be operated manually. The person skilled in the art further understands that all cleaning devices comprise collection means in order to collect the cleaning fluid and preferably recycle it into the cleaning process.

FIGS. 11A, 11B, and 11C shows the inventive cleaning process. After the mould drum has been placed into the cleaning unit (please compare FIG. 11A), preferably first the front ends 3, 4 are cleaned by a nozzle 30. Subsequently, the cover- and/or fastening means 26 are brought into contact with the first front end 3. It should be noted that the cover- and/or fastening means 23 is still in its remote position. Subsequently, the cleaning fluid is introduced into the cover 26 and flows from there through the passages 8. Since the cover- and/or fastening means 23 is still in its remote position, the passages 8 are open at the second front end 4 of the mould drum 1 and the fluid introduced into the passage via cover 26 can escape from front end 4. Thus, the passages 8 are rinsed and food particles in the passage can be removed. This process step is depicted in FIG. 11B Subsequently, as depicted in FIG. 11C, the cover- and/or fastening means 23 is moved from its remote position to the contact position with the mould drum. Now, the passages 8 are closed at the second front end 4 and a cleaning- and/or drying-fluid forced into the passage, must leave the mould drum via the porous cavities 2 so that the porous structure of the cavities are cleaned during this stage of the cleaning process. After the cleaning of the porous structure is finalized, if desired, air can be forced through the passages. This can be done by either first bringing the cover 23 in its remote position again so that first the passages are dried and afterwards, after the cover 23 is in contact with the front end of the mould drum again, the porous structure of the cavities is dried. The cleaning fluid can be water and if needed water with a cleaning agent. The water can be heated, however, in a first step always cold water should be used in order to avoid denaturalization of the protein structure of the meat.

FIGS. 12A, 12B, and 12C show a first embodiment of the forming apparatus, which utilizes the inventive mould drum as depicted and described in FIGS. 1A and 1B to produce formed products, for example patties. The mould drum 1 is supported in a support frame 42 of the forming apparatus, which is for example part of the main frame of the forming apparatus. The support frame 42 is preferably engineered as described above.

Bearings 21 are provided on both ends of the axis of rotation 5 to bear the rotating drum relative to the forming apparatus. The bearing can be a self-lubricating bearing but preferably the bearing is provided as a roll bearing, preferably as a stainless steel roll bearing. The bearing can be also of any other material, for example plastic, preferably high performance plastic. The bearing must be resistant against the forces, which occur during the formation of formed products. Furthermore, the bearing must be resistant against the temperature and the cleaning agent in the cleaning apparatus as described above. Instead of the bearing on the journals of the drum, it is also possible to make the bearing part of the forming apparatus. The drum assembly 1 will be placed in or on the support frame by a movable unit which has been described above or which is described according to the subsequent figures. During filling of the cavity, it is desirable that the cavities are vented via the porous structure and the passage 8 in the mould drum. During discharge of the formed food product from the cavity, air under pressure will be fed to the front end of the drum and flows from there through the passages 8 and the porous structure to the cavity of the mould drum 1. To achieve this, one front end 3, 4 of the mould drum is provided with a cover 43 with fluid connection points. When the movable unit 36 has put the mould drum in/on the support frame 42, cover 43 will be moved by associated drive means such that the cover 43 is in contact with one of the front ends 3, 4 of the mould drum 1. This drive means can be motor or manual drive means. Once the cover is in contact with the front end of the drum, it will be secured in this position manually or automatically.

The cover 43 which also secures the drum relative to the support frame is preferably provided with sealing means 44, for example of a labyrinth, lip seal or an O-ring seal to prevent a leakage between the cover 43 and the front end 3 of the drum 1. During production, the mould drum 1 is rotated while the cover 43 is preferably in a stationary position. As soon as one row of cavities has reached the filling position, one connection point in cover 43 is connected with the ambient and/or preferably with a vacuum so that air can escape from the cavities during their filling. While or after the row of cavities has been filled with food starting material, the mould drum 1 continues its rotation and when it has reached its discharge position, one connection point in the cover 43 will be connected with a pressurized fluid source, for example an air source, for discharging the formed food product from the cavity 2. The fluid will flow from the fluid source via the cover 43 into the passage 8 and from there through the porous structure of one or more cavities, which are aligned in one row. It is also possible to provide the cover 43 with slots so that one or more passages 8 and/or one or more rows of cavities are provided with air in the discharge position. It may be also desirable that even after discharge of the product, the fluid flow, for example the air flow, is maintained in order to clean the porous structure of the cavity. The cover 43 is therefore preferably an exchangeable piece, which can be adapted dependent on the product to be formed. The other front end 4, in the present case on the right hand side, is also provided with a cover 46 mainly to close the opening of the passages 8. After the movable unit 36 has put the mould drum 1 in the support frame of the forming apparatus 40, the cover 46 will be moved manually or automatically by associated drive means 48, which move the cover 46 from a remote position into a position where the cover 46 is in contact with the front end 4 of the mould drum 1. Preferably, the cover 46 is provided with sealing means 47, preferably embodied as described above, in order to prevent fluid-, preferably air-, leakage between this front end 4 of the mould drum and the cover 46. This cover can be either in a stand still position or can rotate together with the drum.

FIGS. 13A, 13A1, 13B, 13B1, 13C, and 13C1 show the movable unit 36 in three different embodiments. In all cases the movable unit comprises a fork 58 with two arms which is adjustable in its height. The mould drum 1 is beared on the fork 58 of the movable unit 36. In the embodiment according to FIG. 13A, the axis of rotation 5, which extends from both ends of the mould drum 1, lies on the fork 58. In the embodiment according to FIG. 13B, a segment of the circumference of the drum lies on the fork 58. In both cases, the front end of the fork comprises securing means, here indentations, in order to avoid that the drum rolls off the fork. In the embodiment according to FIG. 13B, the mould drum lies with its entire length on the fork.

The forming apparatus preferably comprises guiding means (not depicted) to secure the movable unit 36 always in a defined position relative to the forming apparatus, in order to assure that the drum is placed on the support frame in the correct position. For placing the mould drum 1 in/on the support frame 42, the fork 58 is lowered until the axis of rotation of the mould drum is fully supported by the support frame 42 of the forming apparatus. The lowering of the mould drum 1 can be carried out manually or automatically. When utilizing the solution according to FIGS. 13A and 13B. the outfeed belt for the formed products must be shifted in a remote position. This is not the case in the embodiment according to FIG. 13C as can be seen from FIGS. 14A and 14B. In this case, the movable unit 36 carries drum 1 from underneath. Advantageous in this embodiment is that the drum can be placed and removed from the side of the forming apparatus. The outfeed belt need not be replaced in this embodiment according to the present invention.

FIGS. 15A and 15B show yet another embodiment of the present invention. In this case, the support frame 42 at the front end 4 is designed differently. Here, the cover 46 is not shifted linearly as in the preceding examples but is rotated into the locking position. This movement can be carried out manually or automatically. Preferably, cover 46 comprises sealing means 47. Other than that reference is made to the description of FIGS. 12-14. Different in comparison to the other examples is also the drive means 45 of the cover 43. In the present case, this cover is operated manually. A leaver 45 also locks cover 43 once it is in contact with the front end 3 of the mould drum 1.

Figure 16B:
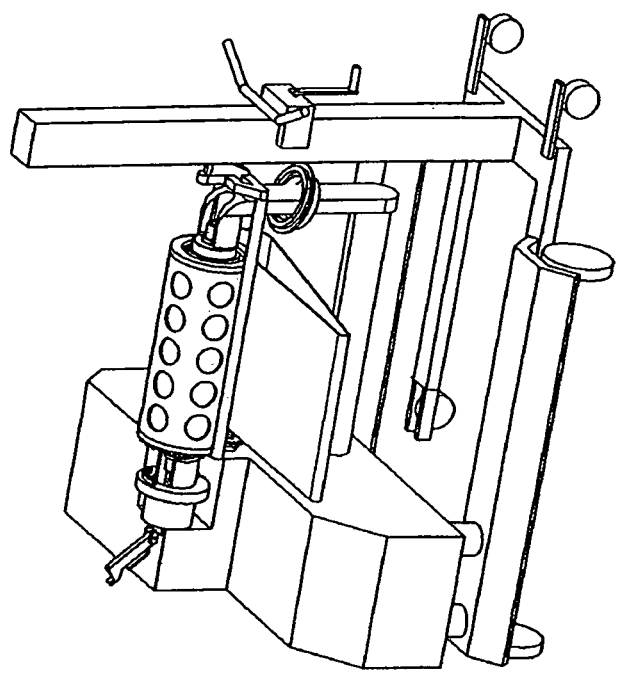
FIG. 16B is a perspective view showing illustrative features of a forming apparatus and a moveable unit according to the teachings herein.
Figure 16A:
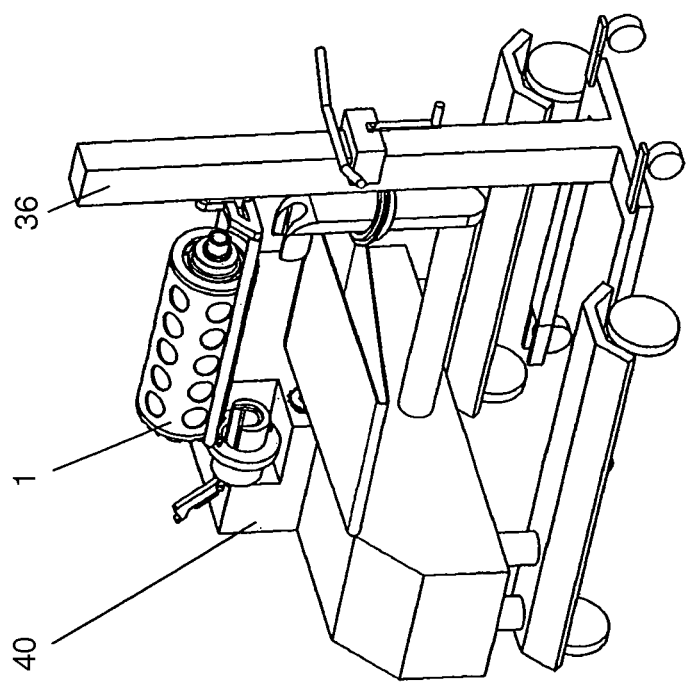
FIG. 16A is a perspective view showing illustrative features of a forming apparatus and a moveable unit according to the teachings herein.

FIGS. 16A and 16B show the loading of the drum into the forming apparatus. Essentially, reference can be made to the disclosure made regarding FIGS. 14A and 14B. However, the shifting and locking mechanisms of the covers 43, 46 is as described according to FIGS. 15A and 15B.

Figure 17C:
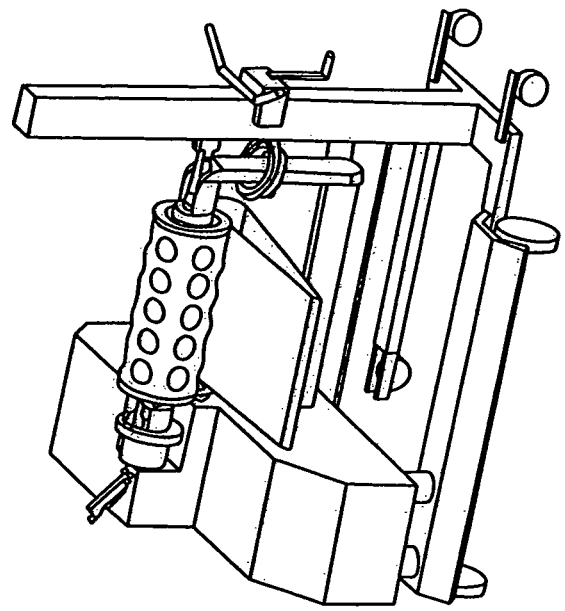
FIG. 17C is a perspective view showing illustrative features of a forming apparatus, a mould drum, and a moveable unit according to the teachings herein.
Figure 17B:
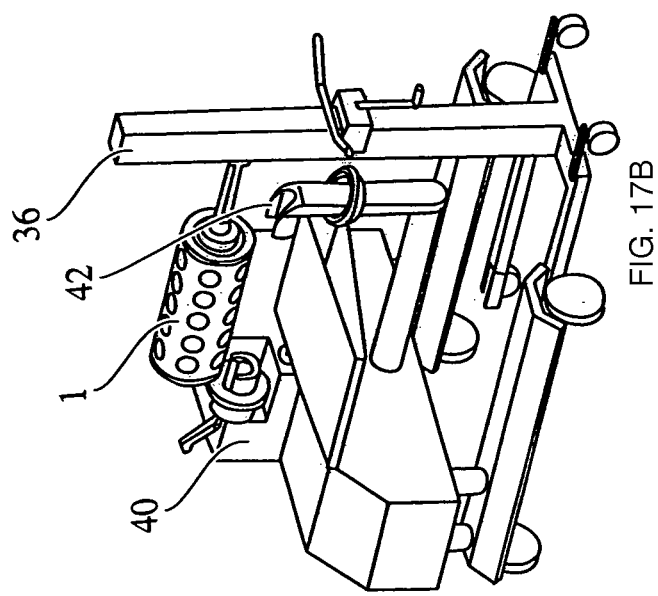
FIG. 17B is a perspective view showing illustrative features of a moveable unit and a mould drum for inserting/removing the mould drum from a forming apparatus.
Figure 17A:
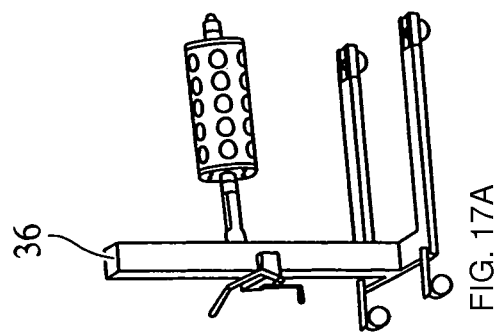
FIG. 17A is a perspective view showing illustrative features of a moveable unit and a mould drum according to the teachings herein.

FIGS. 17A, 17B and 17C show another loading mechanism of the mould drum 1. In the present case, the mould drum comprises a hollow shaft or a hollow journal into which a spindle, which is part of the movable unit 36 is inserted. After the mould drum has been placed on support 42, the spindle is drawn out of the mould drum while removing the removable unit 36 from the forming apparatus.

FIGS. 18A, 18B, 18C, and 18D show several embodiment of a movable unit 57. In a first embodiment (FIG. 18*a*), the unit is provided with a shaft/spindel 72. This shaft/spindle can be inserted into a drum opening 80 of mould drum 1. In a second embodiment (FIGS. 18B and 18C) a fork 58 is used which is holding the drum from underneath. The shaft/spindle but especially the fork can be provided with elastic for example plastic parts to prevent that the, preferably partly porous, surface of the mould drum will be damaged. Preferably the elastic parts are carrying the first frond end 3 and second front end 4. In factories the floors are often gently sloped. This can cause problems with transferring the drum from the movable unit to the cleaning apparatus and/or the forming apparatus or vice versa. This problem is solved by providing the movable unit with an align mechanism 81. This mechanism can be used for the embodiment with fork as shown in FIG. 18B or 18C but can also be used for the embodiment with spindle. The aligning mechanism aligns the fork or the shaft/spindle to the slope of the forming- and/or cleaning-apparatus. In the embodiment in FIG. 18D, mechanism 81 consist of a turning knob 86, pressure piece 88 and hinge pin 87 which allows the shaft/spindle or fork to rotate perpendicular to the floor. Other align mechanism designs are possible too.

The movable unit can be equipped with a sensor that detects the angle of the drum or lifting/support means for the drum in the cleaning apparatus or forming apparatus. The movable unit could even be fitted with a motor and a battery and, depends on what the sensor measures, automatically adjust the angle of fork 58 or spindle 72 with the angle of the lifting/supporting means of the drum in the cleaning apparatus or forming apparatus.

FIGS. 19A and 19B shows the cleaning apparatus 40 which is here provided with a hood which can be opened to place/remove the mould drum. The cleaning apparatus including the hood can be provided with window(s) 76 to inspect the cleaning process.

Both the cleaning apparatus and forming apparatus preferably provided with a positioning means 85 to assure a trouble free placement and removal of the mould drum, particularly to fix and/or bring the movable unit into a clearly defined position relative to the cleaning apparatus and forming apparatus. Preferably the movable unit is provided with for example a magnet and both the cleaning apparatus and forming apparatus with a sensor to detect the presence of the movable unit. The control unit detects the movable unit and when, for example one or more preset, conditions are full-filled, only then lifting means can be operated.

During cleaning the mould drum 1 is stationary and a distributor, here a spray bar 71, with here a multitude of nozzles 70, rotates via drive means 69 (not shown) around the drum and is connected to a cleaning fluid connection 75. On both outer ends of the drum cover and/or fastening means 66 with sealing means 67 are provided, which are moved towards the drum by drive means 68. Cover means 66 is provided with cleaning fluid connection 73 and air source connection 74.

In case the movable unit 57 doesn't have lifting means, in both, the cleaning apparatus and/or forming apparatus, at least one, preferably two lifting/supporting means 82, 83 is/are provided, to place the mould drum from the movable unit to the cleaning apparatus and/or forming apparatus and vice versa. This lifting/supporting means 82, 83 can also be used to lower and/or lift the mould drum during cleaning and/or to alternate the support during the cleaning of the mould drum, in case the drum is not rotated, respectively. This assures that the areas where the drum is supported by the lifting/supporting means 82, 83 is cleaned as well.

The lifting/supporting means 82, 83 can be designed in several ways; with 2, 3, 4 or more supporting means as long as the drum support is stable enough. In the examples according to FIGS. 19A, 19B, 20A, 20B, 20C, 20D, 20E, 20F, 20G, 20H, 22A, 22B, and 22C, the lifting means 82 and 83 are moving linearly and driven, for example by pneumatic cylinders. This invention is not limited to these designs. Other lifting means with linkages, transmissions and other drive units like electro motors, particularly servomotors, AC-motors or the like are also possible.

Figure 20B:
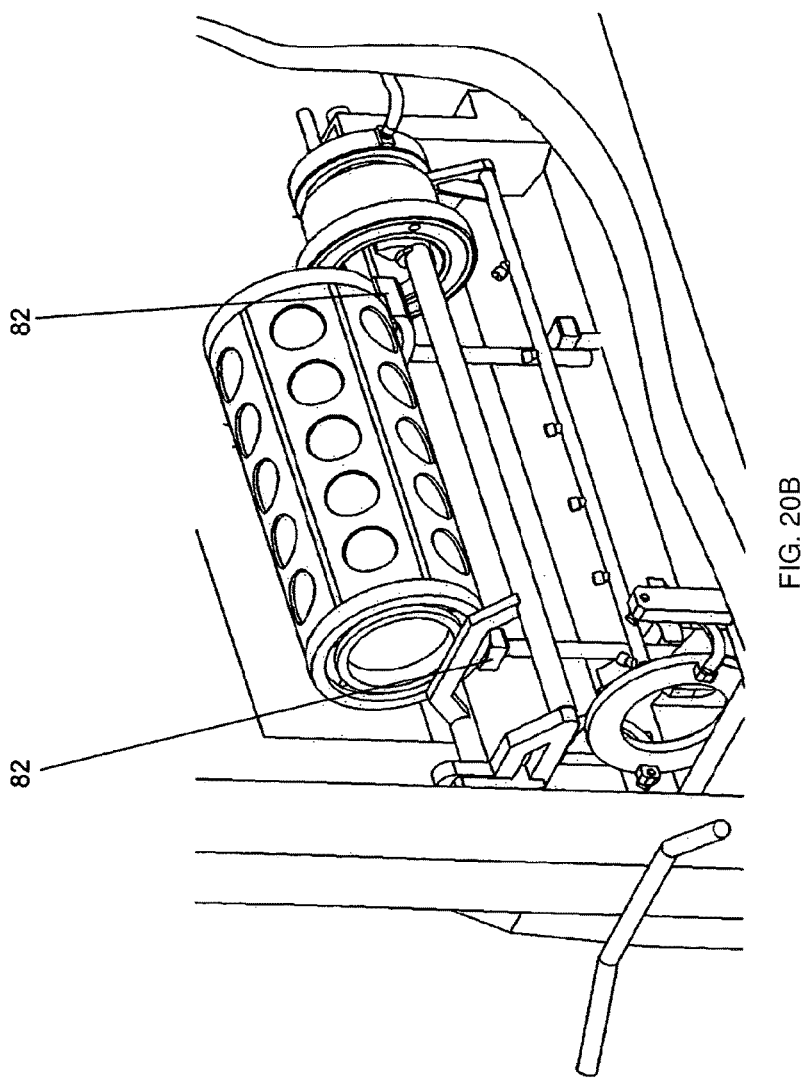
FIG. 20B is a perspective view showing illustrative features of a cleaning apparatus, a moveable unit and a mould drum according to the teachings herein.
Figure 20A:
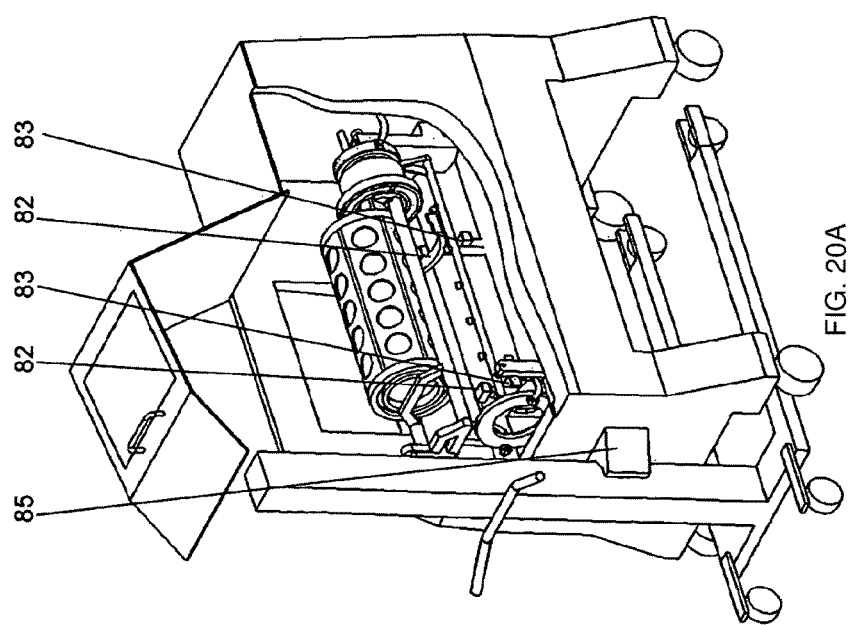
FIG. 20A is a perspective view showing illustrative features of a cleaning apparatus, a moveable unit and a mould drum according to the teachings herein.
Figure 20D:
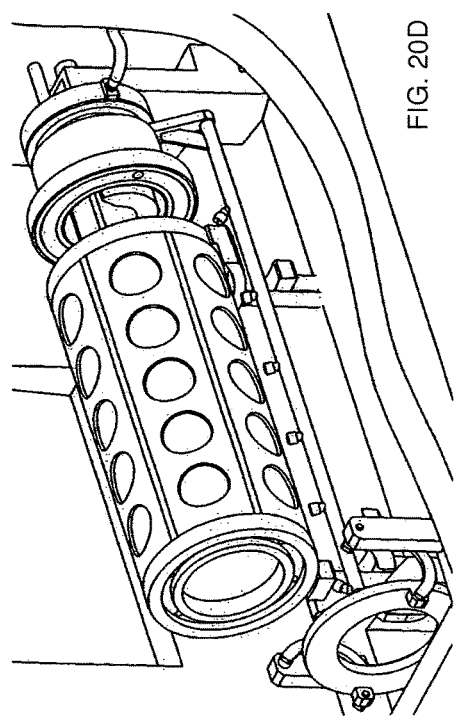
FIG. 20D is a perspective view showing illustrative features of a cleaning apparatus and a mould drum according to the teachings herein.
Figure 20F:
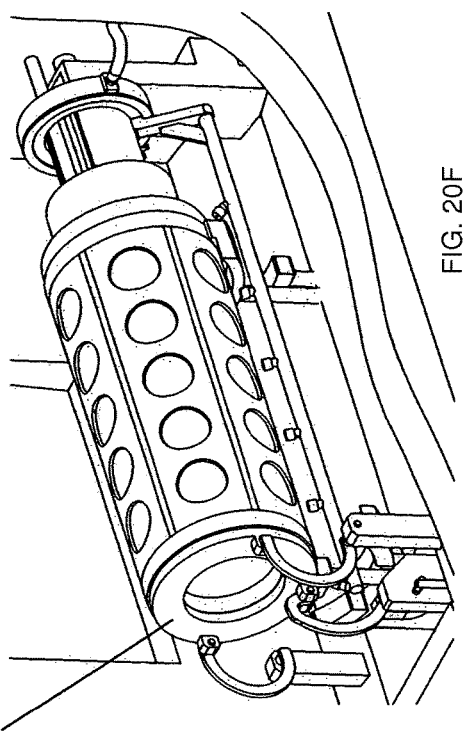
FIG. 20F is a perspective view showing illustrative features of a cleaning apparatus and a mould drum according to the teachings herein.
Figure 20C:
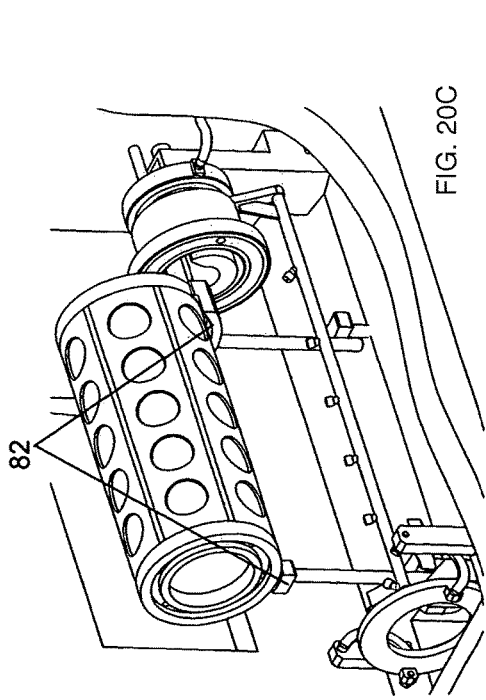
FIG. 20C is a perspective view showing illustrative features of a cleaning apparatus and a mould drum according to the teachings herein.
Figure 20E:
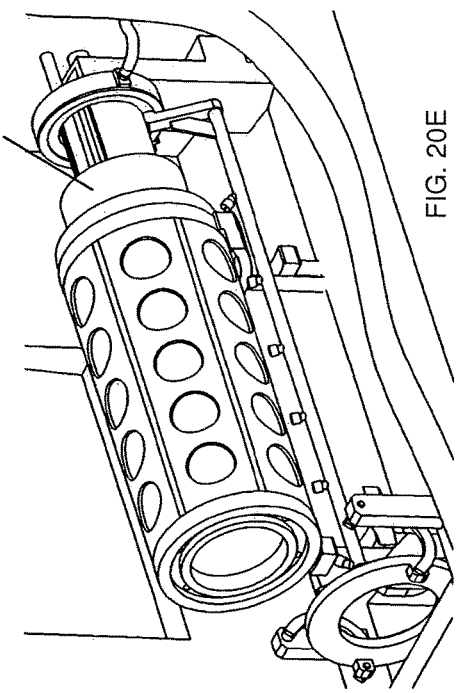
FIG. 20E is a perspective view showing illustrative features of a cleaning apparatus and a mould drum according to the teachings herein.
Figure 20H:
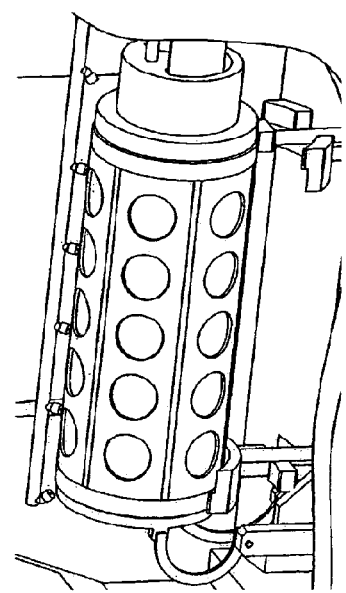
FIG. 20H is a perspective view showing illustrative features of a cleaning apparatus and a mould drum according to the teachings herein.
Figure 20G:
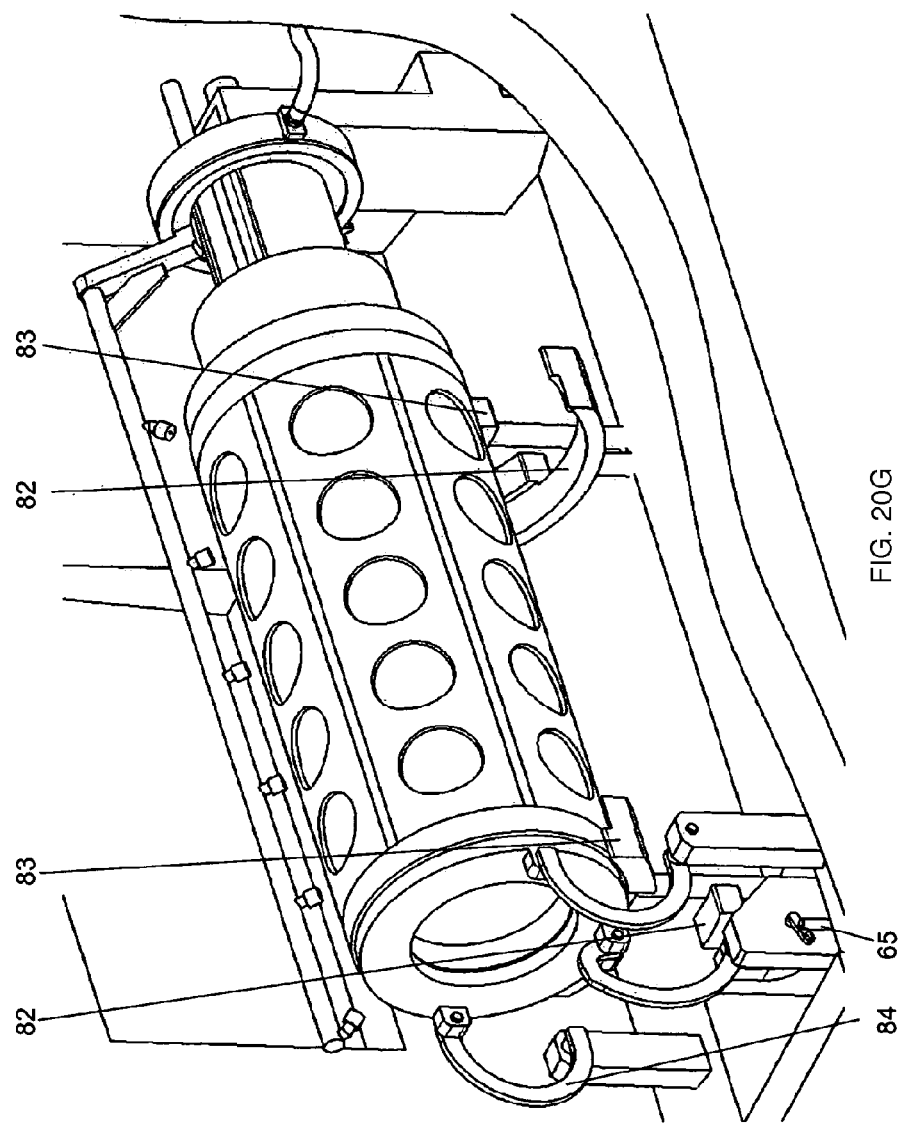
FIG. 20G is a perspective view showing illustrative features of a cleaning apparatus and a mould drum according to the teachings herein.

FIGS. 20A, 20B, 20C, 20D, 20E, 20F, 20G, and 20H shows the placement of the drum in the cleaning apparatus. In FIG. 20A the hood is open and lifting means 82 in cleaning position and lifting means 83 in remote position or vice versa. Now the movable unit 57 with the mould drum on the fork is placed against the positioning means 85 of the cleaning apparatus. In FIG. 20B, the first lifting means 82 are in the drum transfer position. During the movement from the cleaning position to the transfer position, the lifting means 82 lifts the drum from the shaft/spindle or fork of the movable unit. In FIG. 20C, the movable unit is removed. In FIG. 20D, the drum is moved back from the transfer position to the cleaning position. The person skilled in the art understands that the cleaning position and the transfer position can be identical. FIG. 20E, shows the start of the cleaning process. The hood of the cleaning apparatus is preferably closed and cover means 63 is positioned against each axial end of the mould drum 1. Cleaning of the mould drum now takes place as, for example, described above.

FIG. 20F, depicts the next step in the cleaning process with cover 63 against the outer end of the drum. During the cleaning process lifting means 83 will move from remote position to cleaning position. Then lifting means 82 moves from cleaning position to rest position. Now the area where lifting means 82 was supporting the drum can be cleaned by nozzles 70. When the cleaning process is finished the drum can be lifted to the transfer position by lifting means 82 and lifting means 83 moves back to the remote position. The person skilled in the art understands, that it is also possible to operate the cleaning device only with one lifting means 82, 83. In this case, before or during the cleaning process, the lifting/supporting means 82, 83 are, at least temporarily, removed, preferably lowered and the mould drum is only supported at the axial front ends 3, 4. During this removal of the lifting/supporting means 82, 83, the area at which the lifting/supporting means 82, 83 where in contact with the drum can also be cleaned. Subsequently, the lifting/supporting means 82, 83 is lifted again until it is in touch with the mould drum again.

Removal of the drum is executed reciprocally.

Figure 21D:
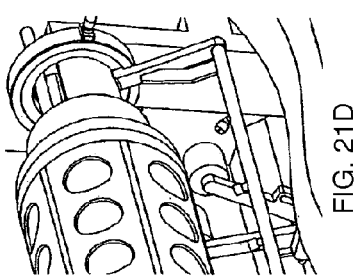
FIGS. 21A, 21B, 21,C, 21D, and 21E are a perspective views showing illustrative features of a cleaning apparatus and a mould drum according to the teachings herein including lifting/support means.
Figure 21E:
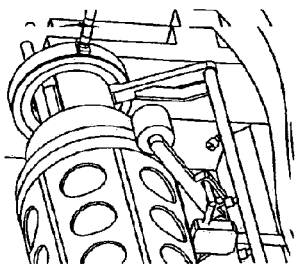
Figure 21B:
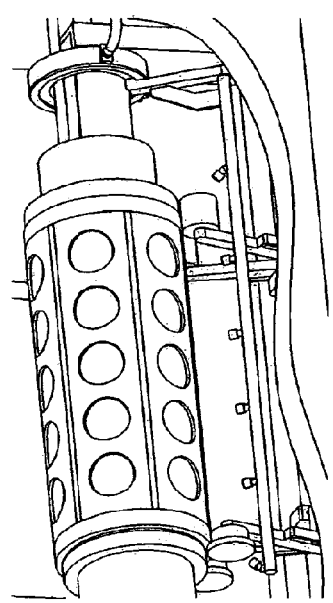
Figure 21C:
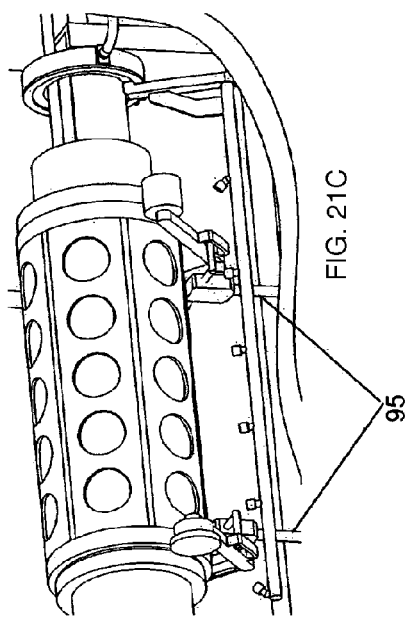
Figure 21A:
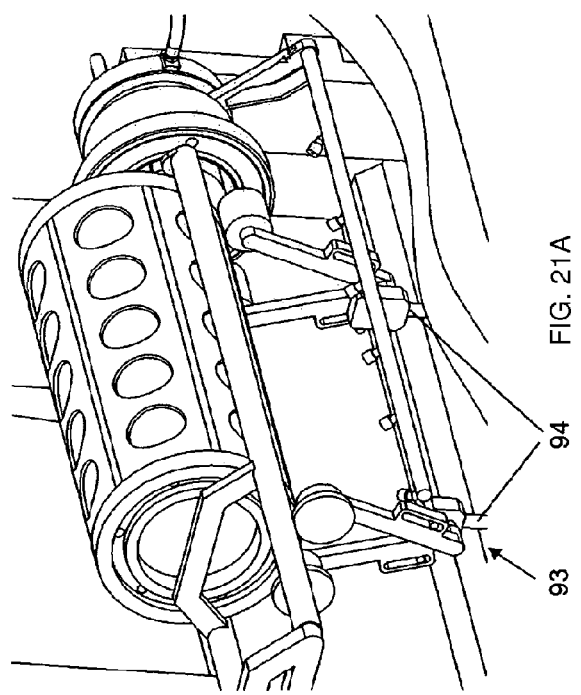

FIGS. 21A, 21B, 21C, 21D, and 21E show a lift/support means 93, with levers and a roller at the end of each lever, to lift/support the drum. Beside a roll a part, for example a plastic part that moves gently along the circumference of the drum is possible too. In FIG. 21A the movable unit has brought the drum into the cleaning apparatus and lifting means 93, consisting here of drive means 94, 95, is now in the transfer position (drum is supported by the rollers). In FIGS. 21B and 21D the rollers are moved to the cleaning position by moving the levers apart and the cleaning process can be started. To clean the area were the rollers support the drum, the rollers can move to a different position. If needed, the support and/or cover of the axial end has to be removed prior to moving the rollers into a different position, because this will result in a different vertical position of the mould drum. However, alternatively, the mould drum can, at least temporarily, be supported at the front ends 3, 4 during cleaning of the mould drum. In this case, the rollers are, during cleaning, at least temporarily removed from the drum to clean the area, which was in touch with the rollers.

FIGS. 20A, 20B, 20C, 20D, 20E, 20F, 20G, and 20H show the first preferred embodiment of the positioning of cover 63 at one or both front ends 3, 44. The cover is connected to link mechanism 84 which is used for automate the cleaning process, and driven by driving means 65 like a pneumatic cylinder or a motor. Link mechanism 84 allows a short movement of cover 63 in axial direction of the drum. The length of the shaft/spindle 72 or fork 58 of the movable unit can be reduced due to this short movement.

Figure 22D:
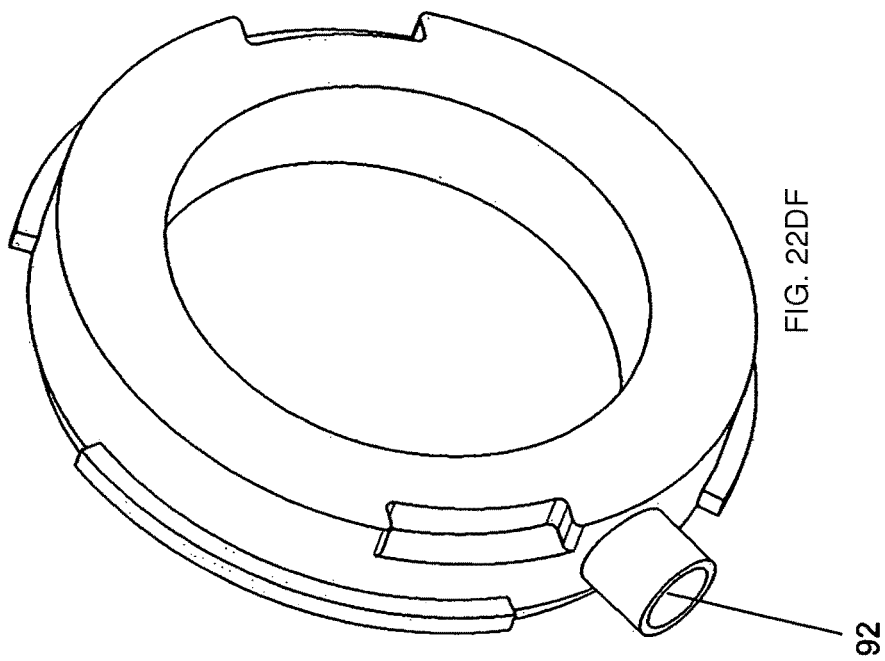

FIGS. 22A, 22B, 22C, 22D, 22E, and 22F show a second preferred embodiment of the mechanism of the positioning of cover 89 at one or both front ends 3, 4. The cover is, for example manually, connected via a bayonet connection to a corresponding front end 3, 4 of drum 1. Thus, the length of the spindle 72 or fork 58 of the movable unit can be reduced. An automated design of the rotating cover is depicted in FIG. 22A. Here, the cover 89 is connected to a driving rod 90. FIG. 22B depicts the position of the cover 89 in the beginning of the cleaning process where passages 8 must be cleaned. Cleaning liquid can flow free from the passages via the opening in cover 89 to the inside of the cleaning apparatus. FIG. 22C depicts the situation further in the cleaning process where the cover closes the passages 8 and the porous cavities can be cleaned.

Figure 22E:
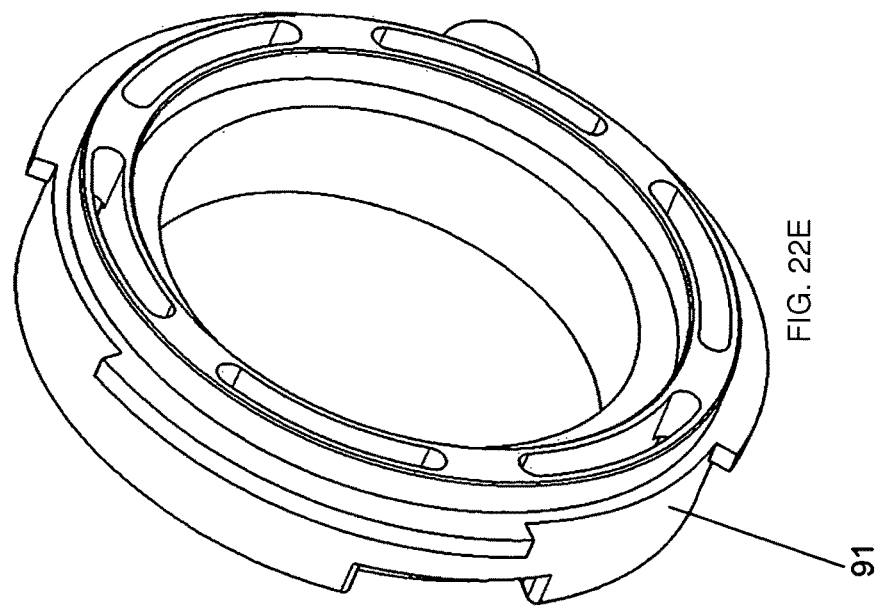

FIGS. 22E and 22F shows that the cover 91 is preferably provided with fluid apertures and an internal fluid channel which ends in a discharge opening 92 which will be provided with a valve.

Reference is now made to FIGS. 23A, 23B, 23C, 23D, 24, 25A, 25B, 26A, 26B, 26C, 26D, 27A, and 27B which depict the forming apparatus 40. The forming apparatus 40 is preferably provided with a positioning part 85 to assure a trouble free placement and/or removal of the mould drum from/to the movable unit 57. lifting/support means of forming apparatus are shown in FIGS. 23A, 23B, 23C, and 23D and FIG. 24.

FIGS. 23A and 23C show that lifting means 97 are moved to the transfer position to take over the drum from the movable unit. When the mould drum sits on lifting means 97, the movable unit can be removed. Then the lifting means 97 move to the remote position and during this movement the drum will be taken over by supporting means 96, as depicted in FIGS. 23B and 23D. Now the drum is in the production position. During production of food products, the mould drum is preferably solely supported by the rollers 96. Removal of the drum from the forming machine to the movable unit goes vice versa. FIG. 24 shows another embodiment wherein combined lifting/support means 82 is used to place, remove and support the drum.

This invention is not limited to these designs. Other lifting means for example 93 in FIG. 21 or with linkages, transmissions and drive units as cylinders and (servo) motors are also possible. During production the drum not necessarily needs to run on rollers, supporting means for the rotating drum 96 and lifting/supporting means 82 can be designed differently, for example as a shoe shaped part.

Mould drum comprises form fit means to rotate the mould drum during the production of formed products. The form fit means can be for example cams integrated in front end 3 but other embodiments are possible too. The drum will be rotated by drive means 98 which will be coupled to the form fit means of the drum when the drum is placed in the forming apparatus. The centre line of drive means 98 is in FIGS. 23A, 23B, 23C, 23D and 24 collinear with the centre line of the drum. It is also possible to drive the drum with the centre line of the drive means not in line with the centre line of the drum.

Figure 25B:
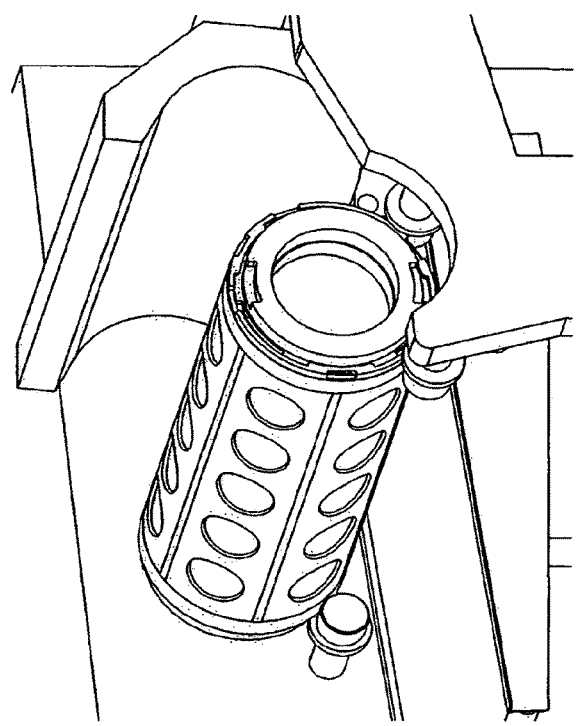
FIGS. 25A and 25B are perspective views showing illustrative features of a forming apparatus according to the teachings herein.
Figure 25A:
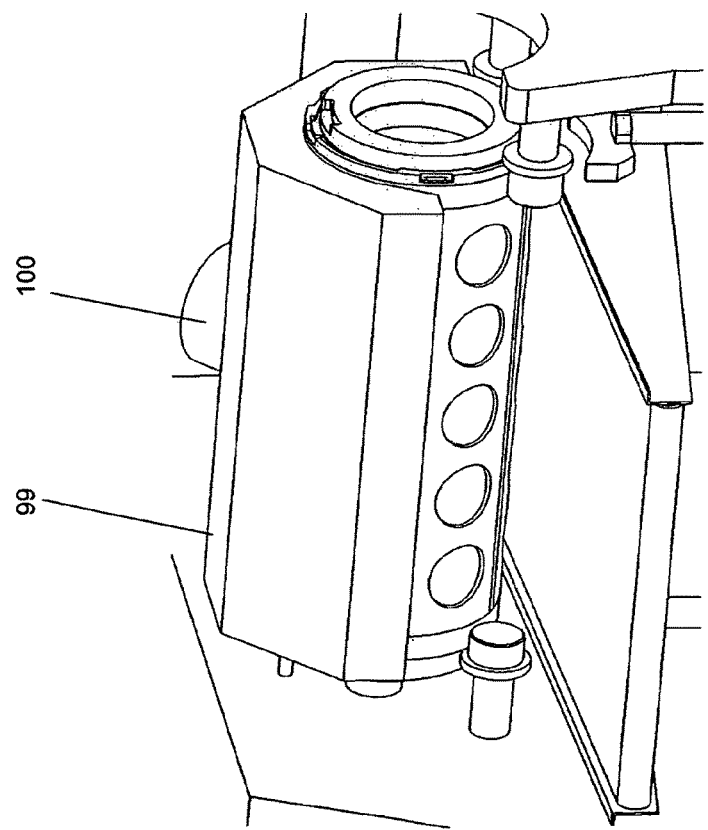

FIG. 25A shows the forming apparatus assembled for production with a seal 99 around the drum and a connection point to a mass supply system 100. In FIG. 25B the seal with the mass supply connection point is turned away to create space to clean all parts of the forming apparatus and/or to remove the drum.

Figure 26B:
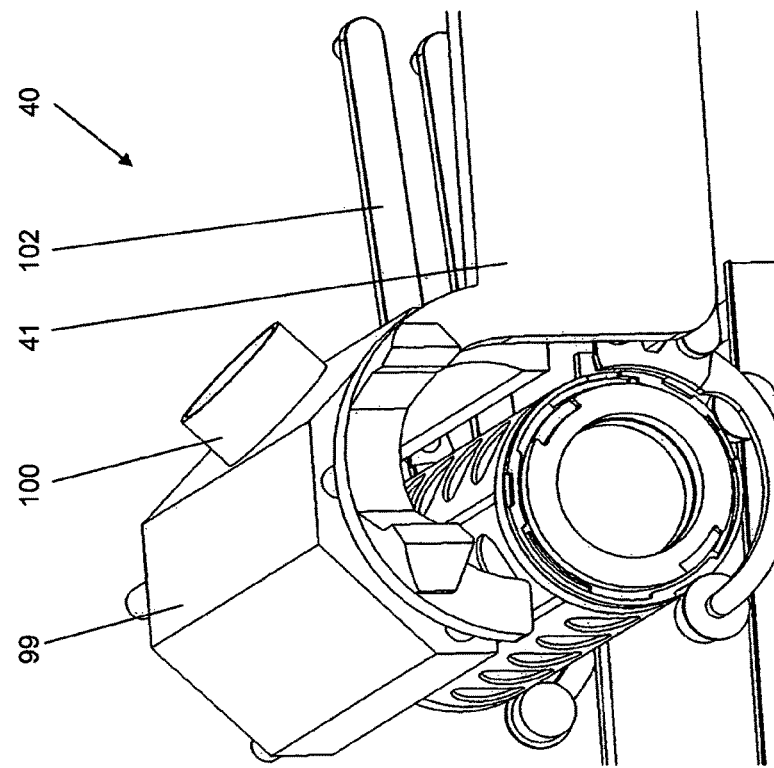
FIGS. 26A, 26B, 26C, and 26D are perspective views showing illustrative features of a forming apparatus according to the teachings herein including a mass supply connection point.
Figure 26A:
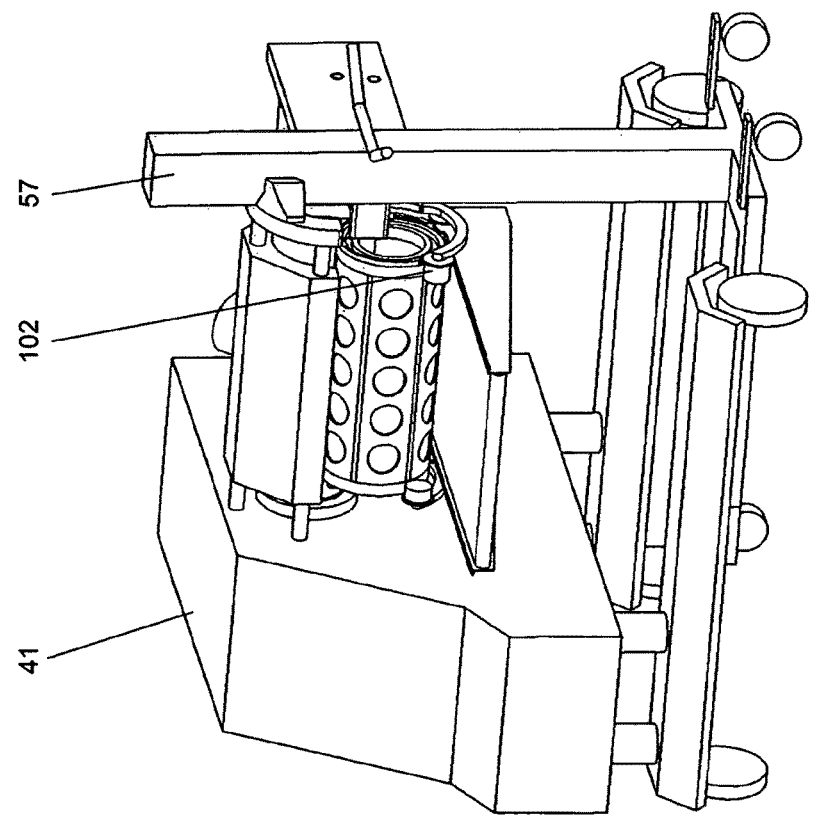
Figure 26D:
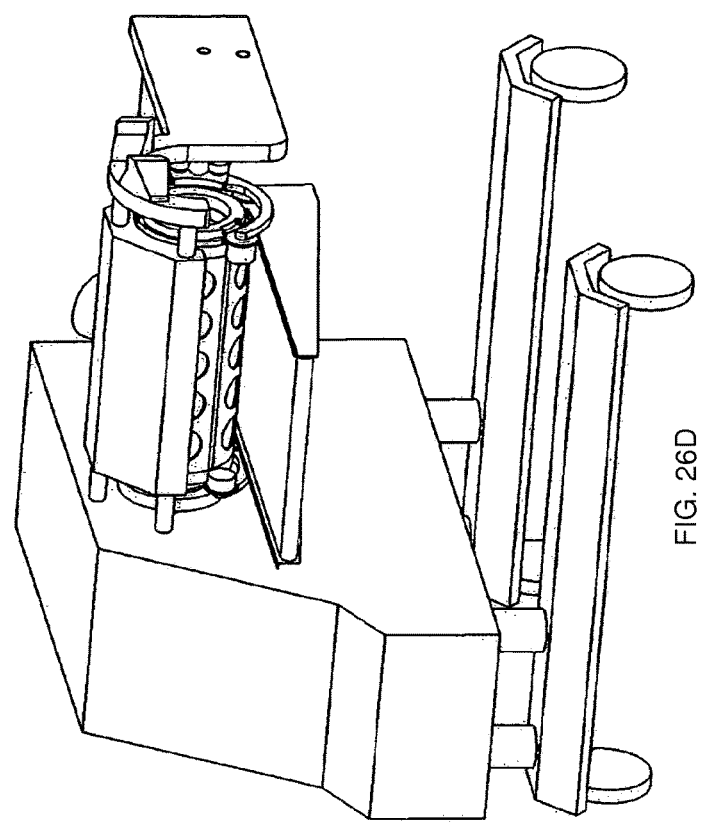
Figure 26C:
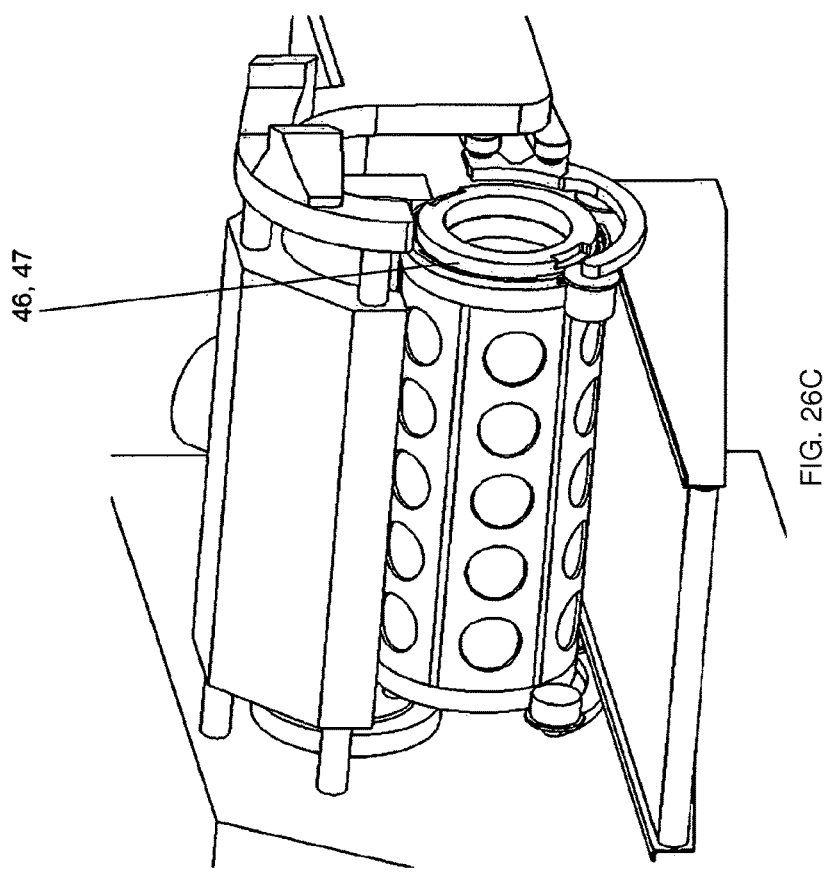

FIGS. 26A, 26B, 26C, and 26D show a different embodiment based on seal 99 and mass supply connection point 100 both fixed to frame 41 of forming apparatus 40. In FIG. 26A positioning, here lifting means 102 is moving the mould drum from a remote position (here lowest position) to the transfer position to take over the drum from the movable unit 57 till the drum supports on lifting means 102. In FIG. 26B lifting means 102 are in a transfer position and the movable unit is removed. In FIG. 26C is depicted that cover means/fastening means 46 and eventually sealing means 47 are be placed in the transfer position of the drum on the second front end 4 of the mould drum to close passages 8. Depending on their size, the cover- and sealing means 46, 47 can be placed on the drum in the production position too. FIG. 26D shows the production position. Unlike the previously described embodiments were first the drum is placed in the forming apparatus and later on the seal 99 is placed over the drum, now the drum is pushed with the combined lifting and pressure means 102 against the stationary positioned seal 99.

While, in the present case, the seal 99 surrounds the drum by almost 180.degree. and the seal 99 is placed around the drum at an angle relative to the horizontal plane, the movement to the lifting and pressure means 102 is not linear, but a rotational movement. This movement assures that the drum will move freely to and into the stationary placed sealing. Other lifting means and pressure means are possible too.

In another embodiment the vertical moving lifting means described in FIG. 24 can be used when the seal 99 is not totally fixed to the frame 41 but is rotatable around an axis of rotation. When cleaning the forming apparatus this is advantageously to also clean the internal surface of the seal 99. After cleaning the seal 99 can be rotated in such a position that the drum can be moved until the surface of the drum contacts the internal surface of the seal. Then the seal 99 can be rotated to its production position and the lifting means can put pressure to the drum to assure a leak free operation.

Figure 27B:
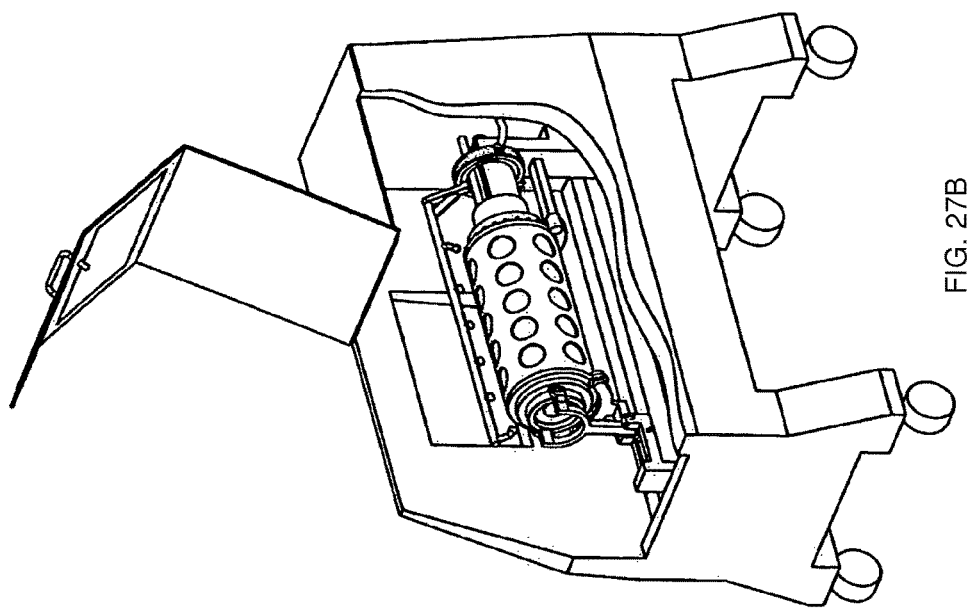
FIGS. 27A and 27B are perspective views showing illustrative features of an illustrative cleaning apparatus with a mould drum. The cleaning apparatus may be used with a moveable unit having a lifting means.
Figure 27A:
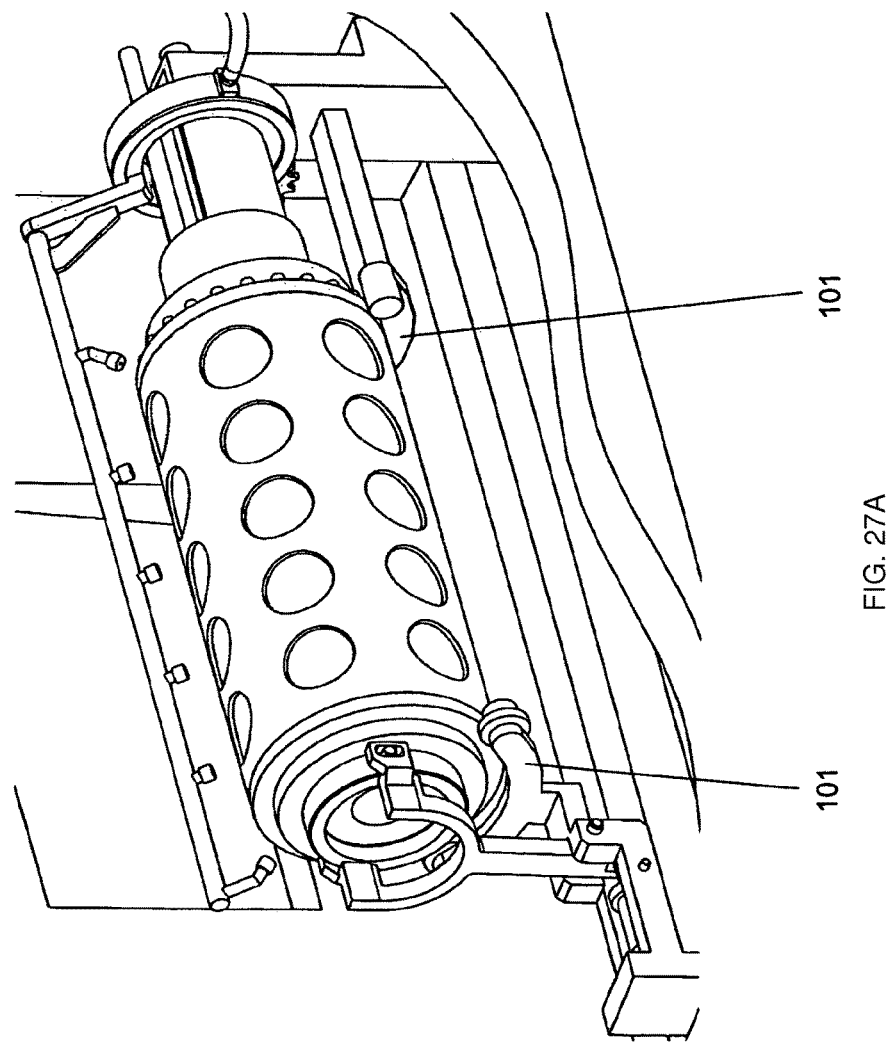
Figure 28B:
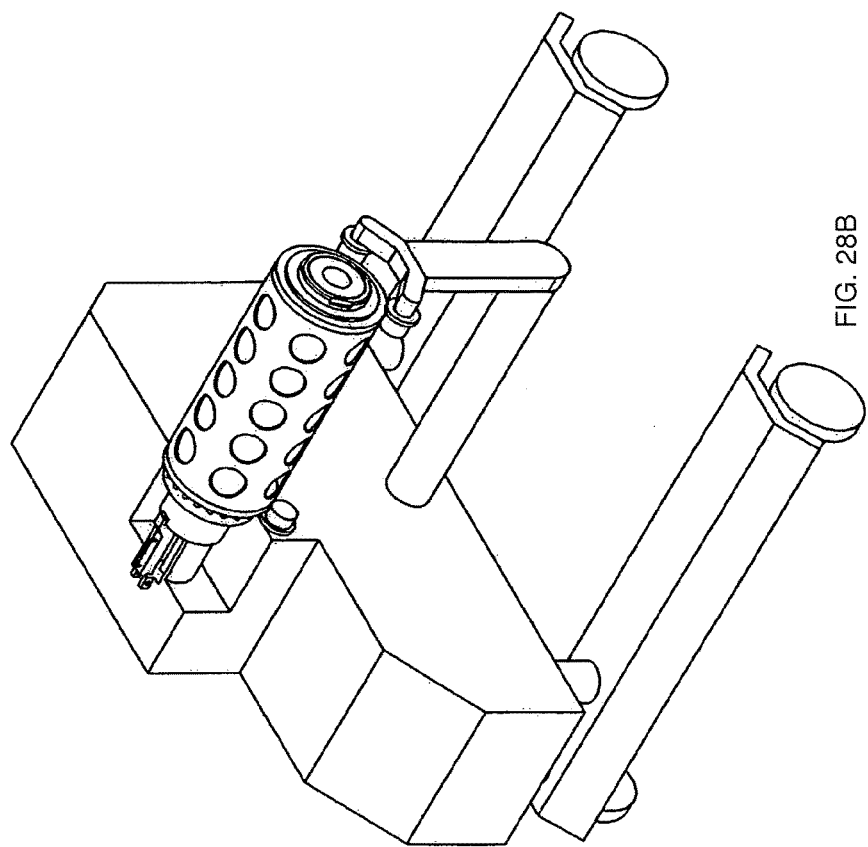
FIGS. 28A and 28B are perspective views showing illustrative features of an illustrative cleaning apparatus including a mould drum. The cleaning apparatus may be used with a moveable unit having a lifting means.
Figure 28A:
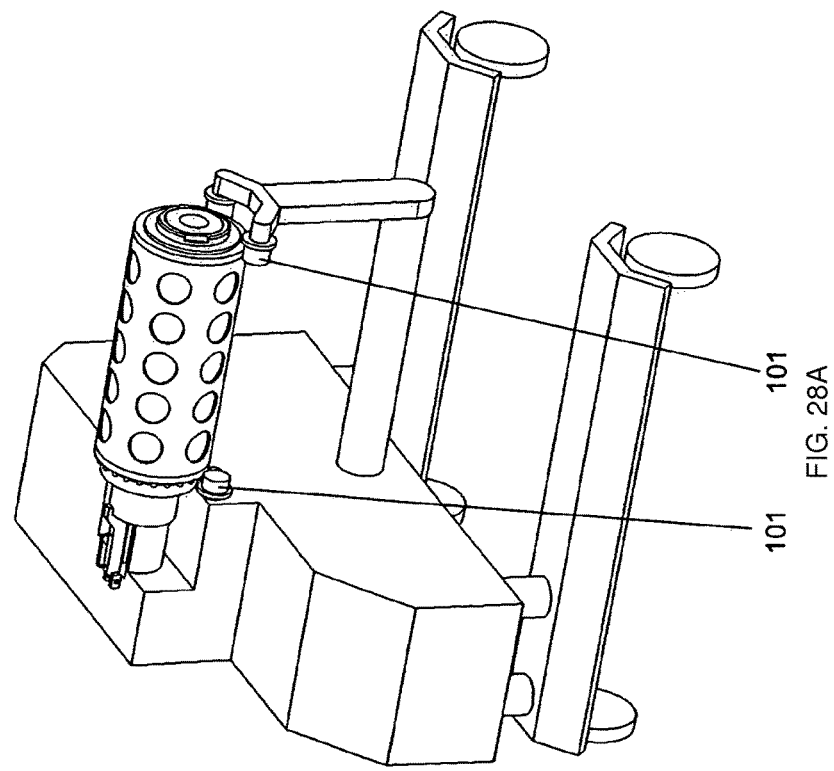

FIGS. 27A and 27B show a cleaning apparatus without lifting means and FIGS. 28A and 28B show a forming apparatus without lifting means wherein the drum is supported by support means 101. Both the cleaning apparatus and forming apparatus will be used together with a movable unit with lifting means for the shaft/spindle and fork (not shown). In the forming machine these support means are preferably rollers with integrated bearings. In the cleaning apparatus these support means can be rollers but while the drum is in stand still position during the cleaning process, the rollers do not have to rotate and do not need bearings. Other designs, for example a shoe shaped part, are also possible for both de forming apparatus and the cleaning apparatus.

Figure 29A:
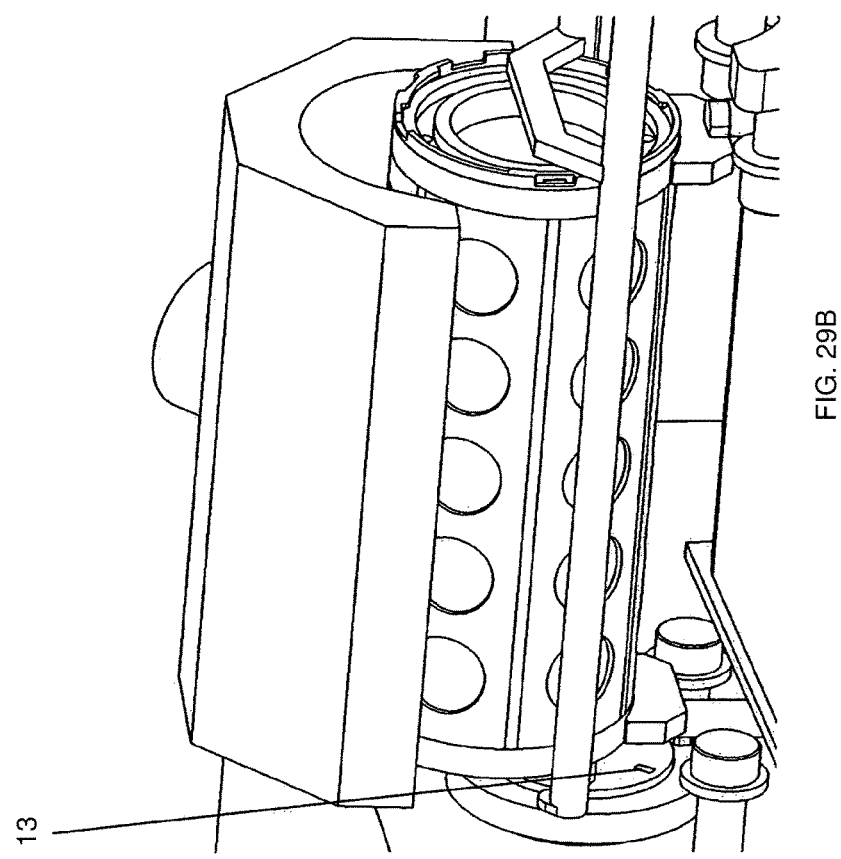
FIG. 29A is a perspective view showing illustrative features of a cleaning apparatus according to the teachings herein. The cleaning apparatus may include recognition means.
Figure 29B:
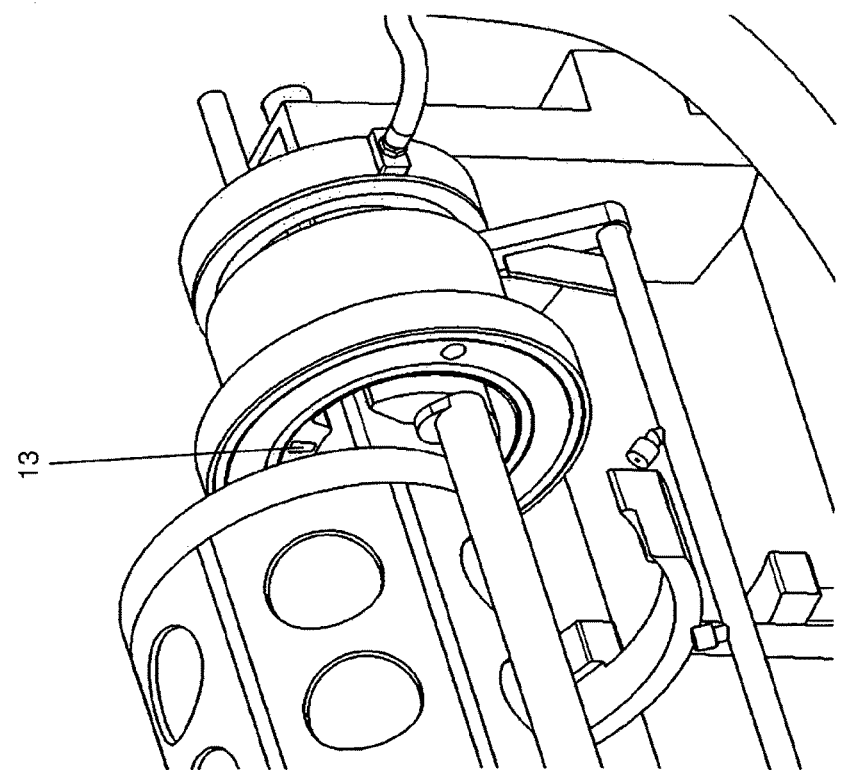
FIG. 29B is a perspective view showing illustrative features of a forming apparatus according to the teachings herein. The forming apparatus may include recognition means.

FIG. 29A shows a possible location of recognition means 13 in the cleaning apparatus and FIG. 29B shows a possible location of recognition means in the forming apparatus.

There are several ways to position the drum in axial direction and keep it in that position in the cleaning apparatus and/or forming apparatus. The movable unit in combination with positioning part 85 will preferably position the drum in a pre-defined position in the cleaning apparatus or forming apparatus. When using rollers or a shoe shaped support part, one set of rollers or support part can be provided with a collar to restrict movement of the drum in one longitudinal direction. By using securing means in the other longitudinal direction of the drum the position of the drum is fully defined in its longitudinal direction. Securing means that can be used are covers 46, 63, 66, 89 and 91 and/or drive means 45 and/or additional drive means. When using manually operated covers the drum has to be slid manually to its correct position. When using automatic operating covers or (additional) drive means, drive means will slide the drum to the correct position. The drum can be kept in position in its longitudinal direction by its associated drive means, by ridges or cams or by additional drive means when it is desired to position the drum in an automated process. When using support means (including rollers) which are provided with tapered grooves and associated recesses on both outer ends of the drum (or vice versa) the drum lowers during placing in the cleaning apparatus or forming apparatus directly in the correct position.

LIST OF REFERENCE SIGNS 1 drum
2 product cavities
3 first front end
4 second front end
7 form-fit-means
8 passage
9 distributor
10 bottom
11 sidewall
12 identification means
13 recognition means
20 cleaning apparatus
21 bearing
22 support frame
23 cover-means, fastening-means
24 sealing means for cover-means 23
25 drive-means for cover means 23
26 cover-means, fastening-means
27 sealing means for cover means 26
28 drive-means for cover means 23
29 drive-means for spray means 30, 31
30 spray means, nozzle
31 distributor
32 cleaning fluid connection, air- and/or heated air-source connection for air supply during drying of the drum, ejecting air connection, venting connection during production
36 movable unit
40 cleaning apparatus, forming apparatus
41 frame
42 support frame
43 cover-means, fastening-means
44 sealing means for cover-means 43
45 drive-means for cover means 43/leaver
46 cover-means, fastening-means
47 sealing means for cover means 46
48 housing
57 movable unit
58 fork
60 cleaning apparatus
61 drum
62 support frame
63 cover-means, fastening-means
64 sealing means for cover-means 63
65 drive-means for cover means 63
66 cover-means, fastening-means
67 sealing means for cover means 66
68 drive-means for cover means 63
69 drive-means for spray means
70 spray means, nozzle
71 distributor
72 shaft, spindle
73 cleaning fluid connection passage and cavities
74 air source connection
75 cleaning fluid connection distributor 51
76 housing
80 drum opening
81 align mechanism
82 first lifting/support means
83 second lifting/support means
84 link mechanism cover 63
85 positioning means
86 turning knob
87 hinge pin
88 pressure piece
89 cover cleaning apparatus
90 driving rod
91 cover cleaning apparatus
92 discharge opening
93 lifting means
94 drive means for the drum position
95 drive means for the roller position
96 support means for rotating drum forming apparatus
97 lifting means forming apparatus
98 drive means for drum
99 seal
100 connection point to mass supply system
101 support means cleaning apparatus/forming apparatus
102 lifting and pressure means forming apparatus

What is claimed is:

1. A movable unit to transport a mould drum wherein the movable unit comprises:
   a fork and/or a spindle to bear the mould drum during transport of the mould drum;
   a lifting component for lifting the fork and/or spindle for removing the mould drum from an apparatus; and
   wherein the movable unit connects to a support frame of the apparatus via a positioning part, a guide or other connector so that the position of the movable unit is fixed relative to the apparatus in at least one spatial position prior to lifting the mould drum.

2. The movable unit according to claim 1, wherein the movable unit includes the fork, wherein the fork maintains an axis of the mould drum in a generally horizontal direction.

3. The movable unit according to claim 2, wherein the fork includes two arms.

4. The movable unit according to claim 3, wherein the fork has a front end including a securing feature for preventing the mould drum from rolling off the fork.

5. The movable unit of claim 3, wherein the axis of rotation of the mould drum extends between the two arms of the fork.

6. The movable unit of claim 3, wherein the axis of rotation of the mould drum is generally parallel to the length of the arms of the fork.

7. The movable unit of claim 3, wherein the mould drum is supported along a first circumference of the mould drum by one of the arms and along a second circumference of the mould drum by the other arm.

8. The movable unit of claim 3, wherein the movable unit includes wheels for moving the movable unit, wherein the wheels are connected to a base of the movable unit.

9. The movable unit of claim 8, wherein the movable unit includes a handle for controlling the movement of the movable unit.

10. The movable unit of claim 9, wherein the arms of the fork extend in a generally horizontal direction.

11. The movable unit of claim 1, wherein the movable unit includes the spindle.

12. The movable unit of claim 11, wherein an angle of the spindle is adjustable.

13. The movable unit of claim 12, wherein the movable unit includes a sensor for sensing a presence of the movable unit in relation to an apparatus.

14. A method of transporting a mould drum comprising the steps of:
   i) securing a movable unit to a forming apparatus having a mould drum;
      wherein the movable unit has a fork and/or a spindle to bear the mould drum during transport of the mould drum and a lifting component for lifting the fork and/or spindle for removing the mould drum from the forming apparatus;
   ii) adjusting the height of the fork or spindle of the movable unit after the step of securing so that the mould drum is supported by the fork or spindle; and
   iii) removing the mould drum from the forming apparatus.

15. The method of claim 14, wherein the method includes transporting the mould drum to a cleaning apparatus.

16. The method of claim 15, wherein the method includes a step of sensing a presence of the movable unit in relation to the forming apparatus.

17. The method of claim 16, wherein the movable unit includes the spindle.

18. The method of claim 17, wherein the method includes adjusting an angle of the spindle.

19. A system comprising:
   i. an apparatus including a support frame for supporting a mould drum; and
   ii. a movable unit to transport the mould drum wherein the movable unit has a fork and/or a spindle to bear the mould drum during transport of the mould drum and a lifting component for lifting the fork and/or spindle for removing the mould drum from the apparatus;
   wherein the system includes a positioning part, a guide or other connector for connecting the movable unit to the support frame so that the position of the movable unit is fixed relative to the apparatus in at least one spatial position prior to lifting the mould drum.

20. The system of claim 19, wherein the movable unit includes the spindle, wherein an angle of the spindle is adjustable.

21. The system of 19, wherein the movable unit includes the fork, wherein the fork maintains an axis of rotation of the mould drum in a generally horizontal direction.

22. The system of claim 21, wherein
   the fork includes two arms extending in a generally horizontal direction;
   the movable unit includes wheels connected to a base of the movable unit for moving the movable unit; and
   the axis of rotation of the mould drum is generally parallel to the length of the arms of the fork.

23. The system of claim 21, wherein
   the fork includes two arms extending in a generally horizontal direction;
   the movable unit includes wheels connected to a base of the movable unit for moving the movable unit; and
   the mould drum is supported along a first circumference of the mould drum by one of the arms and along a second circumference of the mould drum by the other arm.

* * * * *

UNITED STATES PATENT AND TRADEMARK OFFICE
CERTIFICATE OF CORRECTION

PATENT NO. : 9,637,365 B2  Page 1 of 1
APPLICATION NO. : 14/748725
DATED : May 2, 2017
INVENTOR(S) : Hendrikus Petrus Gerardus Van Gerwen It is certified that error appears in the above-identified patent and that said Letters Patent is hereby corrected as shown below:

On the Title Page

Item (56), References Cited, Foreign Patent Documents, Line 1:
Delete "AL 2008/091634 A2 7/2008" and insert --WO 2008/091634 A2 7/2008--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*